United States Patent
Ogawa et al.

(10) Patent No.: US 12,077,414 B2
(45) Date of Patent: Sep. 3, 2024

(54) WORK SUPPORT DEVICE AND WORK SUPPORT METHOD

(71) Applicant: KABUSHIKI KAISHA TOSHIBA, Minato-ku (JP)

(72) Inventors: Akihito Ogawa, Fujisawa (JP); Hideichi Nakamoto, Setagaya (JP); Haruna Eto, Kawasaki (JP); Ryosuke Higo, Kawasaki (JP); Junichiro Ooga, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 1173 days.

(21) Appl. No.: 16/798,841

(22) Filed: Feb. 24, 2020

(65) Prior Publication Data

US 2021/0078827 A1   Mar. 18, 2021

(30) Foreign Application Priority Data

Sep. 13, 2019   (JP) .................................. 2019-167726

(51) Int. Cl.
*B66B 5/00* (2006.01)
*B25H 1/00* (2006.01)
*B66B 1/30* (2006.01)

(52) U.S. Cl.
CPC .............. *B66B 5/0025* (2013.01); *B66B 1/30* (2013.01); *B66B 5/0087* (2013.01); *B25H 1/0028* (2013.01); *B25H 1/0092* (2013.01)

(58) Field of Classification Search
CPC ....... B66B 5/0025; B66B 1/30; B66B 5/0087; B25H 1/0028; B25H 1/0092
See application file for complete search history.

(56) References Cited

U.S. PATENT DOCUMENTS

| | | | |
|---|---|---|---|
| 2006/0169208 A1* | 8/2006 | Shinozaki | H01L 21/67017 118/715 |
| 2009/0156011 A1* | 6/2009 | Belen | H01L 21/32137 257/E21.218 |
| 2010/0087955 A1* | 4/2010 | Tsusaka | B25J 9/0003 700/245 |
| 2017/0348859 A1* | 12/2017 | Takebayashi | B25J 11/00 |
| 2018/0105396 A1* | 4/2018 | Purosto | B66B 11/0407 |
| 2018/0147768 A1* | 5/2018 | Ito | B29C 48/92 |
| 2018/0215588 A1 | 8/2018 | Butler et al. | |

(Continued)

FOREIGN PATENT DOCUMENTS

| | | |
|---|---|---|
| CA | 3016842 A1 | 10/2017 |
| CA | 3 071 657 A1 | 4/2019 |

(Continued)

*Primary Examiner* — Behrang Badii
*Assistant Examiner* — Jay Khandpur
(74) *Attorney, Agent, or Firm* — Oblon, McClelland, Maier & Neustadt, L.L.P.

(57) ABSTRACT

According to an embodiment, a work support device includes a measurement unit and an irradiation control unit. The measurement unit measures an in-passage structure of a passage inside of which a user can work. The irradiation control unit controls an irradiation unit to emit light indicative of a work region to a corrected work position obtained by correcting work position information set based on a predetermined designed in-passage structure indicative of an ideal structure in the passage by using a result of the measurement by the measurement unit.

12 Claims, 15 Drawing Sheets

(56) References Cited

U.S. PATENT DOCUMENTS

| | | | |
|---|---|---|---|
| 2018/0319286 A1* | 11/2018 | Greyson | ................... B60L 5/38 |
| 2019/0247994 A1* | 8/2019 | Angold | ...................... B25J 1/02 |
| 2020/0353630 A1* | 11/2020 | Roulet-Dubonnet | ... B66F 9/061 |

FOREIGN PATENT DOCUMENTS

| | | | | |
|---|---|---|---|---|
| JP | 4-251084 A | | 9/1992 | |
| JP | 5-97346 A | | 4/1993 | |
| JP | 5-105362 A | | 4/1993 | |
| JP | 7-173987 A | | 7/1995 | |
| JP | 8-310767 A | | 11/1996 | |
| JP | 2012173243 A | * | 9/2012 | |
| JP | 2019-43760 A | | 3/2019 | |
| JP | 2019-509955 A | | 4/2019 | |
| WO | WO-2006106575 A1 | * | 10/2006 | ............. B66B 1/285 |

* cited by examiner

WORK SUPPORT DEVICE AND WORK SUPPORT METHOD

CROSS-REFERENCE TO RELATED APPLICATIONS

This application is based upon and claims the benefit of priority from Japanese Patent Application No. 2019-167726, filed on Sep. 13, 2019; the entire contents of which are incorporated herein by reference.

FIELD

Embodiments described herein relate generally to a work support device and a work support method.

BACKGROUND

A device that supports works in a passage such as an elevator shaft has been known. For example, an automation system configured to perform automatic work by a robot arranged in the passage without human intervention, and a remote system configured to remotely manipulate a robot have been disclosed. However, in reality, users perform works in passages in some cases. Work environments in passages are different from presupposed work environments in some cases. With the conventional technology, highly accurate supporting of works that suits the on-site status is difficult.

DETAILED DESCRIPTION

According to an embodiment, a work support device includes a measurement unit and an irradiation control unit. The measurement unit is configured to measure an in-passage structure of a passage for a measurement target. The irradiation control unit is configured to control an irradiation unit to emit light indicative of a work region to a corrected work position of corrected work position information obtained by correcting, by using a result of measurement by the measurement unit, work position information set based on a predetermined designed in-passage structure indicative of an ideal structure in the passage. The following describes a work support device and a work support method in detail with the accompanying drawings.

Figure 1:
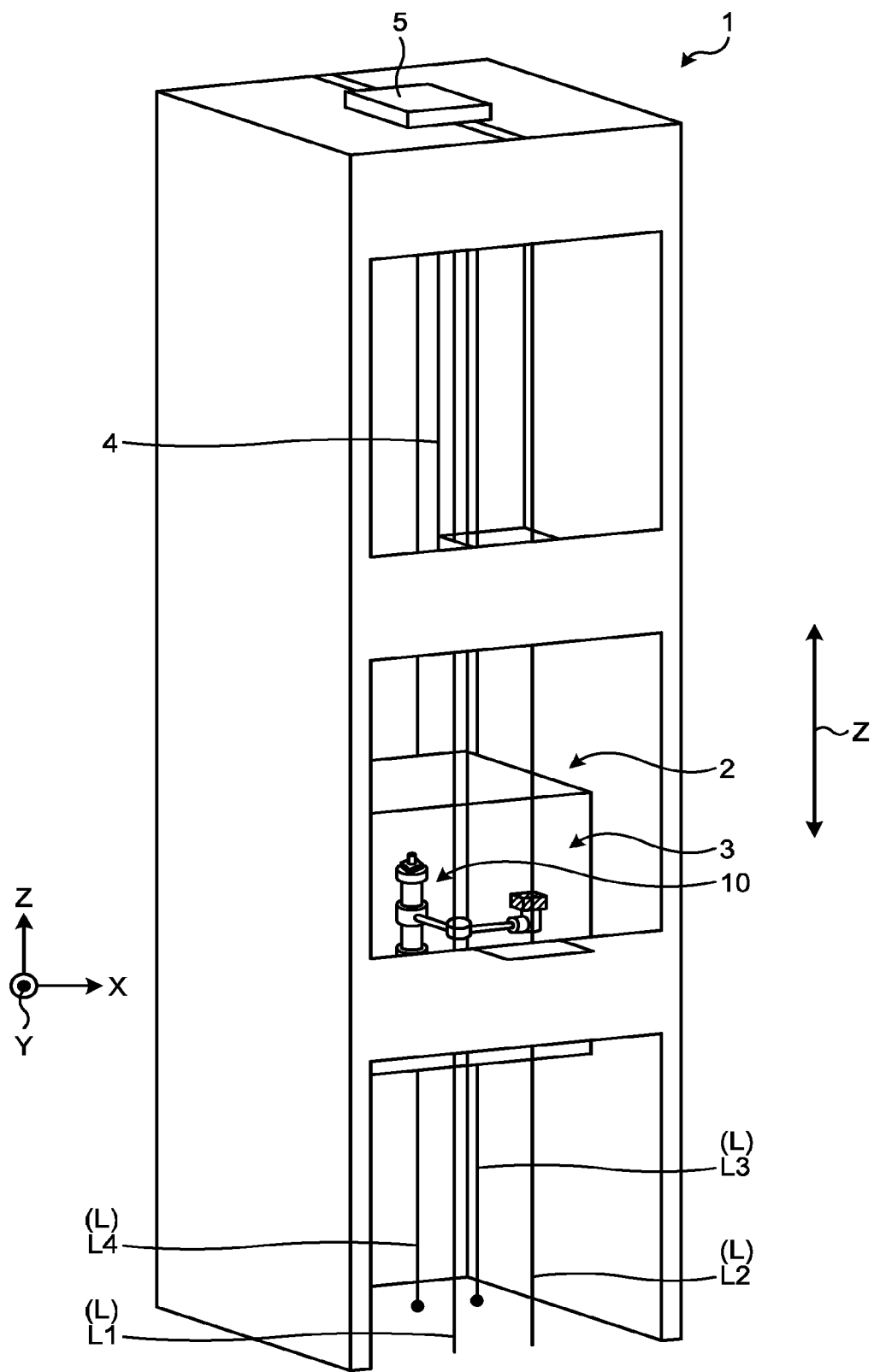
FIG. 1 is a pattern diagram of a work support system according to an embodiment.

FIG. 1 is a pattern diagram illustrating an exemplary work support system 1 according to the present embodiment.

The work support system 1 is a system for supporting a user working in a passage.

The passage has such a size that the user can work inside. For example, the passage is an elevator hoistway, a tunnel inside of which an object such as a vehicle moves, or a sewer. In the present embodiment, the following description will be made with an example in which the passage is an elevator hoistway.

The present embodiment describes below an exemplary mode in which the work support system 1 is applied to an elevator system configured to accommodate a person, a package, or the like thereon and to move in the vertical direction, a direction intersecting the vertical direction, or the horizontal direction. The work support system 1 is applicable to a configuration in which at least part of a mechanism of the later-described work support device is installable in a passage inside of which a user can work, and is not limited to the elevator system.

The work support system 1 includes an elevator shaft 2 and a work support device 10.

The elevator shaft 2 is a hoistway inside of which an elevator moves upward and downward, and is an exemplary passage.

The elevator configured to move along the extension direction (arrow Z direction) of the elevator shaft 2 is arranged in the elevator shaft 2, and moves in the extension direction. Hereinafter, the extension direction of the elevator shaft 2 is also referred to as an extension direction Z. In addition, a direction (X direction or Y direction) intersecting the extension direction Z is also referred to as an intersection direction XY. The Z direction, the X direction, and the Y direction are orthogonal to each other. In the present embodiment, a case where the Z direction is aligned with the vertical direction is exemplified. The Z direction (the extension direction Z) only needs to be the extension direction of the passage of the elevator shaft 2 and the mode is not limited to an aligned mode with the vertical direction.

In the present embodiment, it is assumed that, at maintenance of the work support system 1 or the like, a workbench 3 is installed in the elevator shaft 2 and a user M on the workbench 3 works in the elevator shaft 2.

The workbench 3 is installed in the elevator shaft 2 at maintenance or the like and detachable from the elevator shaft 2. The workbench 3 arranged in the elevator shaft 2 is supported by a displacement member 5 disposed at a top portion of the elevator shaft 2 through a cable 4. The displacement member 5 enables the workbench 3 to move in the extension direction Z in the elevator shaft 2. In other words, the workbench 3 is an exemplary moving member configured to move in the elevator shaft 2.

The workbench 3 may be installed at a gondola unit used at assembly of a normal elevator or the like. Alternatively, the workbench 3 may be the gondola unit. Alternatively, the workbench 3 may be a prepared unit dedicated to the work support system 1. Alternatively, the workbench 3 may be installed at an elevator car configured to move in the elevator shaft 2. Alternatively, the workbench 3 may be the elevator car.

The work support device 10 is arranged in the elevator shaft 2. The work support device 10 may be fixed in the elevator shaft 2 or may be installed on the workbench 3 arranged in the elevator shaft 2. When installed at the workbench 3, the work support device 10 is movable in the elevator shaft 2 in the extension direction Z. In the present embodiment, the following description will be made with an example in which the work support device 10 is installed at the workbench 3.

A plurality of reference lines L (reference lines L1 to L4) are arranged in the elevator shaft 2. Each reference line L is used as a position reference in a cross-section (horizontal section) of the elevator shaft 2 in the intersection direction XY. The reference lines L are lines extending in the elevator shaft 2 in the extension direction Z. The extension along the extension direction Z means extension parallel to the extension direction Z. The reference lines L (reference lines L1 to L4) are arranged by being spaced in the intersection direction XY intersecting the extension direction Z.

FIG. 1 illustrates the four reference lines L1 to L4 as an example. However, the number of reference lines L only needs to be at least two and is not limited to four.

Each reference line L only needs a configuration enabling the position to be detected by an electronic device such as a sensor. The reference line L only needs to be configured, for example, with light such as infrared light having a long wavelength and traveling straight without refracting, or a linear member. The linear member is, for example, a piano wire or a wire. In the present embodiment, the following description will be made with an example in which the reference line L is a piano wire. The position and extension direction of the reference line L are assumed to be predetermined and fixed.

Figure 2:
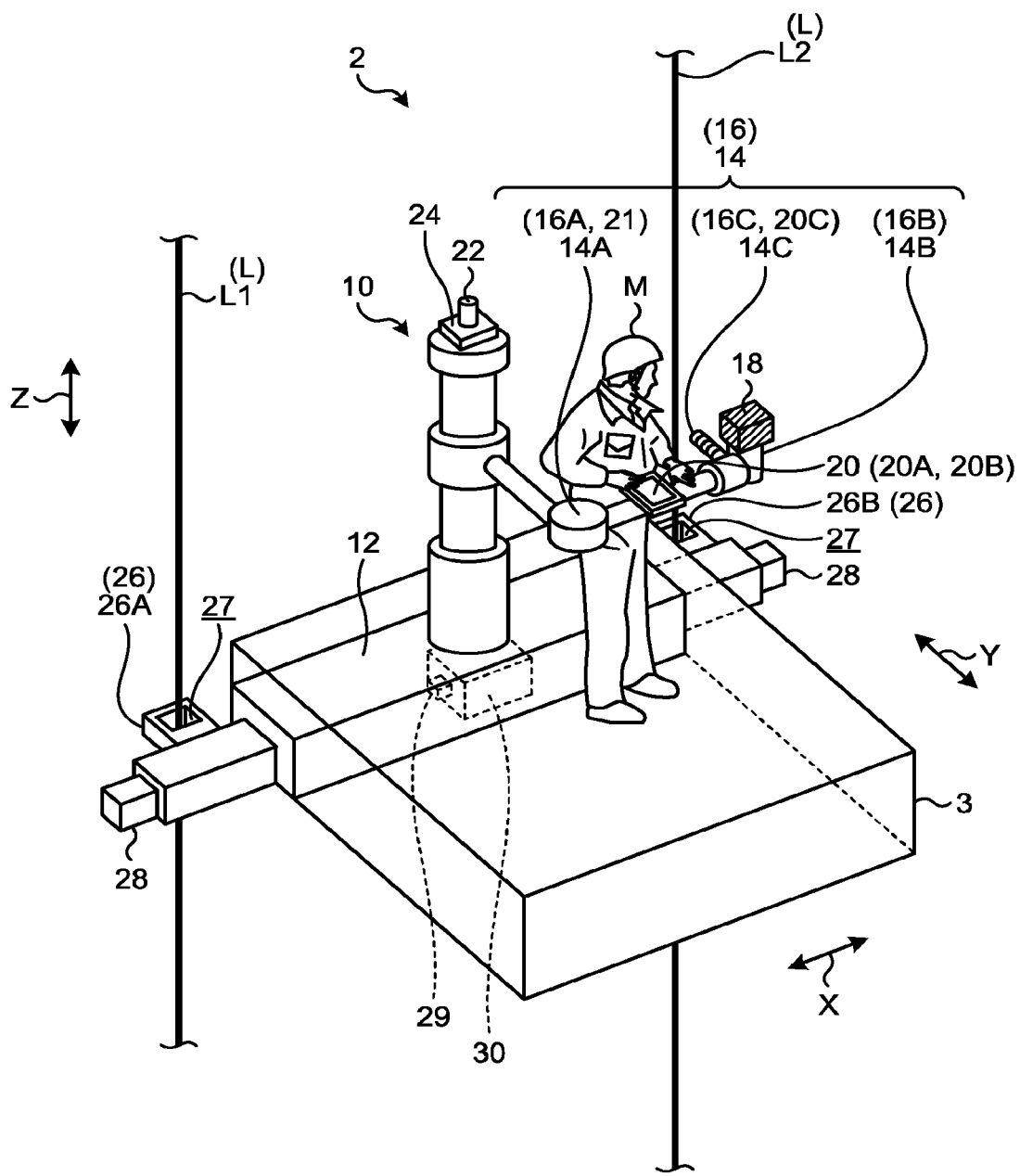
FIG. 2 is a pattern diagram of a work support device according to the embodiment.

FIG. 2 is a pattern diagram of the work support device 10.

The work support device 10 includes a base unit 12, an arm 14, a sensor 16, a user interface (UI) unit 20, a measurement unit 23, an irradiation unit 24, an outrigger unit 28, a communication unit 29, and a main control unit 30.

The base unit 12 is a body part of the work support device 10. The base unit 12 is a unit for holding various members including the arm 14. The base unit 12 includes the main control unit 30, the communication unit 29, and a drive power supply system such as a power source or a compressor. The main control unit 30 is a control mechanism configured to control the work support device 10 (to be described later in detail). The communication unit 29 is a communication interface for communication with an external device.

A reference measurement unit 26 and the outrigger unit 28 are provided at each end of the base unit 12 in the extension direction (arrow X direction). Specifically, a reference measurement unit 26A and the outrigger unit 28 are provided at one end of the base unit 12 in the extension direction, and a reference measurement unit 26B and the outrigger unit 28 are provided at the other end. The reference measurement unit 26A and the reference measurement unit 26B are one example for the reference measurement units 26.

The measurement unit 23 measures the in-passage structure. The in-passage structure will be described later in detail. The measurement unit 23 includes a surrounding measurement unit 22 and the reference measurement units 26.

The surrounding measurement unit 22 observes observation information of the inside of the elevator shaft 2. The observation information is information indicating the internal structure of the elevator shaft 2. In other words, the information indicating the internal structure of the elevator shaft 2 is information indicating a structure of the surrounding of the work support system 1.

The observation information is information indicating the position of each observation point inside the elevator shaft 2. The position of each observation point is expressed with, for example, a distance and a direction (tilt) from the surrounding measurement unit 22. The observation point is an observable portion by the surrounding measurement unit 22. When the surrounding measurement unit 22 is configured to receive reflected light of light emitted from the surrounding measurement unit 22, the observation target is a portion at which light emitted from the surrounding measurement unit 22 is reflected. When the surrounding measurement unit 22 is an image capturing device, the target is a portion imaged at each pixel of a captured image in the elevator shaft 2.

The surrounding measurement unit 22 includes, for example, an image capturing device configured to obtain a captured image by image capturing, a sensor such as a distance sensor (millimeter wave radar, laser sensor, distance image sensor, LIDER, or laser range finder), and a signal processing unit. The signal processing unit generates the observation information from an observation result acquired by the sensor, and outputs the observation information to the main control unit 30. Thus, the observation information is information obtained by observing the actual structure in the elevator shaft 2, such as a tilt and an offset of each of the inner wall of the elevator shaft 2 and a structure.

Each reference measurement unit 26 measures the position of the corresponding reference line L. The reference measurement unit 26 may be a well-known instrument capable of measuring the position of the reference line L in the intersection direction XY, in other words, the position of the reference line L in the horizontal plane.

For example, each reference measurement unit 26 may be a line sensor. In this case, for example, the reference measurement unit 26 has a structure with a through-hole 27 formed and has an arrangement with the corresponding reference line L going through the through-hole 27. The reference measurement unit 26 includes a plurality of irradiation units configured to emit (or irradiate) light into the through-hole 27, and a plurality of light receiving units each configured to receive the corresponding light. The reference measurement unit 26 may measure the position of the reference line L in the horizontal plane (intersection direction XY) by measuring the position of the light received by each light receiving unit.

Specifically, the reference measurement unit 26A measures the position of the reference line L1 in the horizontal plane (intersection direction XY) and outputs a result of the measurement to the main control unit 30. Similarly, the reference measurement unit 26B measures the position of the reference line L2 in the horizontal plane (intersection direction XY) and outputs a result of the measurement to the main control unit 30.

The irradiation unit 24 is a mechanism configured to emit light. In the present embodiment, the irradiation unit 24 emits light toward, for example, the inner wall surface of the elevator shaft 2 or a bracket provided in the elevator shaft 2. The irradiation unit 24 emits light indicating a work region by controlling of the main control unit 30. The light indicating a work region is, for example, work position instruction information or work position guide information.

The irradiation unit 24 is, for example, a laser pointing device or a projector but not limited thereto. The laser pointing device is for example, a laser marker.

The outrigger unit 28 is a unit for fixing the work support device 10 in the elevator shaft 2. An expansion-contraction part of the outrigger unit 28 is expanded from the base unit 12 and pressed against the inner wall surface of the elevator shaft 2 or a bracket or guide provided in the elevator shaft 2. The work support device 10 and the workbench 3 become in a fixed state to the elevator shaft 2 by the pressing of the expansion-contraction part of the outrigger unit 28. The outrigger unit 28 suppresses swinging (i.e. movement) of the workbench 3, thereby preventing disturbance (or trouble) due to swinging from occurring to work by the user M working on the workbench 3.

The arm 14 is an assist mechanism for holding a member 18.

The member 18 is an object that the user M contacts or holds when working inside the elevator shaft 2. Examples of the member 18 include various instruments and tools such as an electric drill and an impact driver, and various attachment members such as a bracket, a guide rail, a counter weight, and a component.

Thus, the arm 14 is a mechanism for supporting handling of the member 18 by the user M. In the present embodiment, the arm 14 is provided to the base unit 12.

For example, the arm 14 includes an assist arm 14A, a holding unit 14B, and an operation handle 14C.

The assist arm 14A includes a plurality of joints and a plurality of link parts, and each joint is driven by a drive unit 21. The assist arm 14A is provided with a sensor 16A for detecting the posture and drive state of the assist arm 14A. The sensor 16A is an exemplary sensor 16. The sensor 16A may be a well-known sensor such as a torque sensor.

The tip (i.e., end) of the assist arm 14A, to which the holding unit 14B and the operation handle 14C are connected, is movable in three axial directions of the upward-downward direction, the forward-backward direction, and the rightward-leftward direction and can be positioned. In addition, the tip of the assist arm 14A connected to the holding unit 14B and the operation handle 14C can change, at each position, the posture of a held object attached to the holding unit 14B about each of axes in the upward-downward direction, the forward-backward direction, and the rightward-leftward direction. The assist arm 14A illustrated in FIG. 2 includes an upward-downward operation part at a basal part connected to the base unit 12, a horizontal rotation part for movement in the forward-backward and rightward-leftward directions, and a joint configured to determine the posture of the holding unit 14B and arranged at a connection part of the holding unit 14B. In this manner, the joint for the upward-downward direction and the joint for the forward-backward and rightward-leftward directions are independent from each other, which allows a human to intuitively and easily understand motion of the assist arm 14A and perform work safely. On the other hand, the joint configuration of the assist arm 14A is not limited to the above-described configuration as long as the tip is movable and the posture is changeable. The present disclosure is also achievable with a configuration in which each joint, a rotational axis, and a moving direction are not independent from each other as in a vertical multijoint robot.

In normal use of the arm 14, the drive unit 21 generates reaction force against a load due to the mass of the member 18 held by the holding unit 14B, and drives the assist arm 14A for balancing. In work interruption by the user M, the drive unit 21 fixes the posture of the assist arm 14A by braking all axes such that the posture of the assist arm 14A is not changed.

To support, for example, definition of a work direction by the user M, the assist arm 14A is configured to allow posture change in accordance with work by the user M and the posture of the user M by, for example, preventing movement in the upward-downward and rightward-leftward directions but allowing movement in a straight movement direction with small force.

The posture of the assist arm 14A is acquired from, for example, an encoder arranged at each joint of the assist arm 14A. The sensor 16A such as a torque sensor is arranged at each joint of the assist arm 14A to measure torque exerted on the joint. The drive unit 21 may acquire measurement results of the posture of the assist arm 14A and the torque and perform the above-described drive. In addition, a touch sensor may be arranged on, for example, the surface of the assist arm 14A. In this case, the drive unit 21 may drive the assist arm 14A to perform operation to avoid interference with the user M or an object by using a measurement result received from the touch sensor.

The holding unit 14B is a mechanism configured to hold the member 18. The holding unit 14B includes a mechanism such as a sandwiching mechanism or an electromagnetic chuck to hold the member 18. The holding unit 14B is provided with a sensor 16B for detecting a holding state of the member 18 by the holding unit 14B. The sensor 16B is an exemplary sensor 16. The sensor 16B may be a well-known sensor.

The operation handle 14C is a handle for the user M to perform change of the posture of the assist arm 14A and operation of the position and posture of the member 18 held by the holding unit 14B.

The operation handle 14C is provided with a sensor 16C and a switch 20C. The sensor 16C is an exemplary sensor 16. The sensor 16C detects grasping of the operation handle 14C by the user M. The switch 20C receives operation inputting by the user M. The switch 20C has a configuration with operation by the user M, enabling, for example, switching between on and off of assist power drive of the assist arm 14A, performing zero-point correction of the assist power driving, and switching between on and off of braking with respect to the driving of the assist arm 14A and on and off of force to hold the member 18 by the holding unit 14B.

The sensor 16A, the sensor 16B, and the sensor 16C are referred to as the sensor 16 when collectively described below.

The UI unit 20 is an interface through which, for example, the user M is notified of various kinds of information such as the state of the work support system 1 and the procedure of work, the user M inputs various instructions, and the user M instructs recording of a work status.

The UI unit 20 has a function to receive operation inputting by the user M and a function to output various kinds of information. For example, the UI unit 20 includes a display 20A and an input unit 20B.

The display 20A displays various kinds of information. The display 20A is, for example, a well-known organic electro-luminescence (EL) display or a liquid crystal display (LCD). The input unit 20B receives various instructions from the user. The input unit 20B is, for example, a keyboard, a mouse, a touch panel, or a microphone. The UI unit 20 may further include a speaker configured to output voice.

Figure 3:
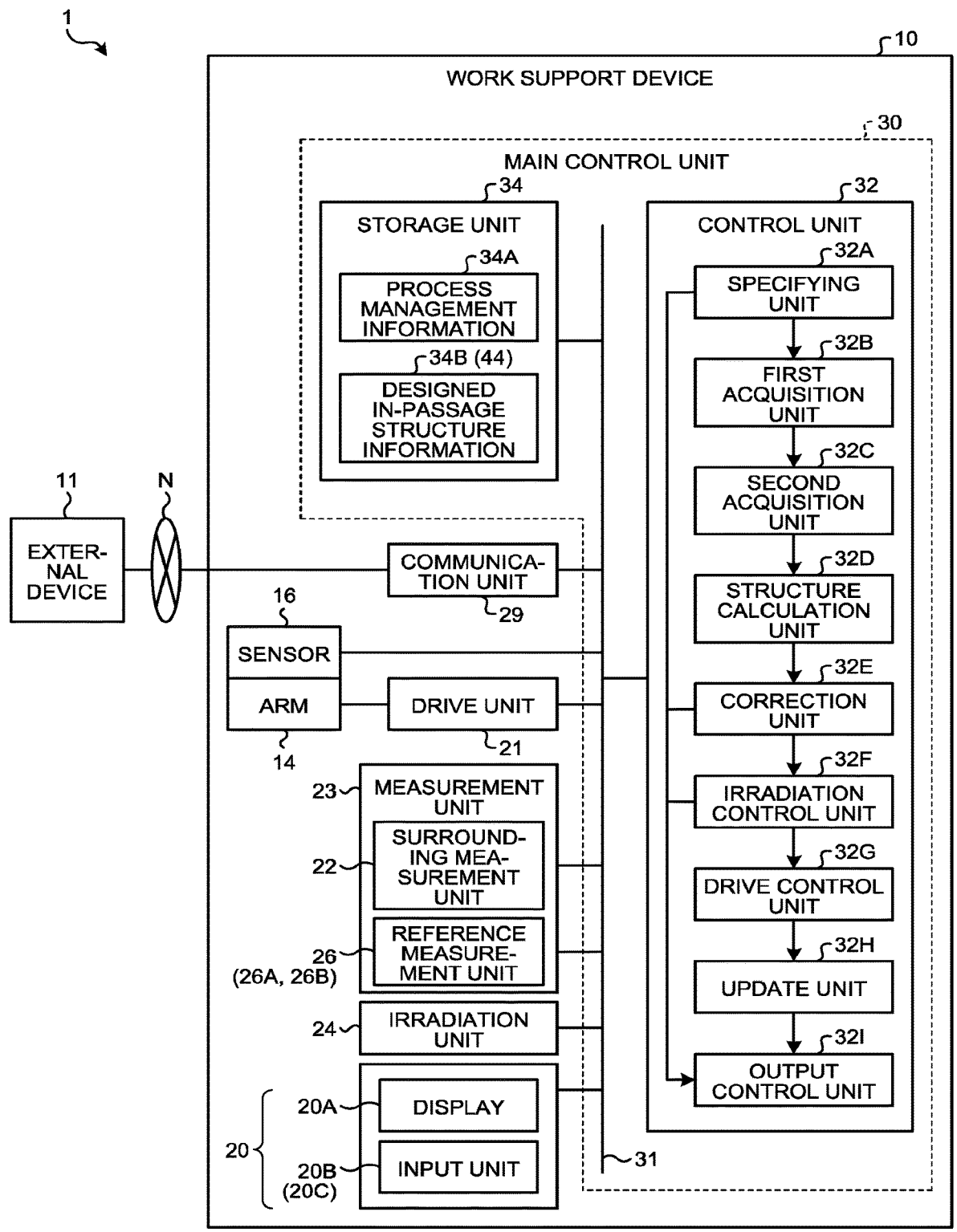
FIG. 3 is a functional block diagram of the work support system according to an embodiment.

FIG. 3 is a functional block diagram illustrating an exemplary functional configuration of the work support system 1 according to the present embodiment.

The work support system 1 includes the work support device 10 and an external device 11. The external device 11 and the work support device 10 are connected with each other in a communicable manner through a network N or the like.

The external device 11 is a well-known computer such as a server device. For example, the external device 11 is a server device such as a building information modelling (BIM) system for designing a work process in advance.

The work support device 10 includes the UI unit 20, the sensor 16, the UI unit 20, the drive unit 21, the surrounding measurement unit 22, the measurement unit 23, the irradiation unit 24, the reference measurement unit 26, the communication unit 29, and the main control unit 30. The drive unit 21 and the arm 14 are electrically connected with each other.

The main control unit 30 is, for example, a dedicated or general-purpose computer. The main control unit 30 includes a control unit 32 and a storage unit 34.

The control unit 32, the storage unit 34, the UI unit 20, the sensor 16, the UI unit 20, the drive unit 21, the surrounding measurement unit 22, the measurement unit 23, the irradiation unit 24, the reference measurement unit 26, and the communication unit 29 are connected with each other in a communicable manner through a bus 31.

At least one of the storage unit 34, the UI unit 20, the sensor 16, the UI unit 20, the drive unit 21, the surrounding measurement unit 22, the measurement unit 23, the irradiation unit 24, and the reference measurement unit 26 may be connected with the control unit 32 in a communicable manner through the communication unit 29 and the network N.

The storage unit 34 stores various kinds of data. In the present embodiment, the storage unit 34 stores process management information 34A and designed in-passage structure information 34B.

For example, the process management information 34A and the designed in-passage structure information 34B are generated at the external device 11 in advance and stored in the storage unit 34 of the work support device 10. For example, the work support device 10 transmits data request information to the external device 11 to receive the process management information 34A and the designed in-passage structure information 34B from the external device 11. The work support device 10 may store the process management information 34A and the designed in-passage structure information 34B thus received in the storage unit 34 in advance. The process management information 34A and the designed in-passage structure information 34B will be described later in detail.

The storage unit 34 is, for example, a semiconductor memory element such as a random access memory (RAM) or a flash memory, a hard disk, or an optical disk. The storage unit 34 may be a storage device provided outside the work support device 10. The storage unit 34 may be a storage medium. Specifically, the storage medium may include computer programs and various kinds of information downloaded through a local area network (LAN), the Internet, and the like and stored or temporarily stored. The storage unit 34 may be formed of a plurality of storage media.

At least one of the storage unit 34 and the control unit 32 may be mounted on the external device 11 such as a server device connected with the network N. In addition, at least one of functional components (described later) included in the control unit 32 may be mounted on the external device 11 such as a server device connected with the control unit 32 through the network N.

The control unit 32 includes a specifying unit 32A, a first acquisition unit 32B, a second acquisition unit 32C, a structure calculation unit 32D, a correction unit 32E, an irradiation control unit 32F, a drive control unit 32G, an update unit 32H, and an output control unit 32I. At least one of the specifying unit 32A, the first acquisition unit 32B, the second acquisition unit 32C, the structure calculation unit 32D, the correction unit 32E, the irradiation control unit 32F, the drive control unit 32G, the update unit 32H, and the output control unit 32I is achieved by, for example, one or a plurality of processors. For example, each above-described component may be achieved by a processor such as a central processing unit (CPU) executing a computer program, in other words, by software. Each above-described component may be achieved by a processor such as a dedicated integrated circuit (IC), in other words, by hardware. Each above-described component may be achieved by both software and hardware. When a plurality of processors are used, each processor may achieve one of components or two or more of the components.

The specifying unit 32A reads the process management information 34A and specifies work position information of the next work process.

The process management information 34A is information for managing a work process. The process management information 34A is information that defines a work position for each of one or a plurality of work processes. Specifically, the process management information 34A is information associating a work process ID, work process information, work position information, work state information, and work content information.

The work process ID is identification information of the work process. For example, the work process ID is expressed by a number indicating a work order. The work process information is information indicating the work process, such as the name of the work process. The work position information will be described later. The work state information is information indicating a work state and indicating the progress status of the work process of the corresponding work process information. In the present embodiment, the work state information is information indicating any of "work yet to be done" indicating that work is yet to be done and "work completed" indicating that the work is completed. In the initial state, the work state information is set to be the information indicating "work yet to be done".

The work content information is information indicating a work content performed in the corresponding work process. The work content information is information used to present the work content to the user M. The work content information and the process management information 34A are produced by, for example, the external device 11 in advance. The work content information includes, for example, installation information related to installation of the member 18, detailed information of the work content, and procedure information of the work.

The work position information is information indicating the work position in the elevator shaft 2 in the corresponding work process.

Specifically, the work position information is information indicating the work position in the elevator shaft 2. The work position information is generated from for example, the designed in-passage structure information 34B and information indicating the work position (for example, a drilling position).

The work position information is expressed by a relative position using a reference position as a reference. The reference position is the position of each reference line L. As described above, the position of the reference line L is measured by the corresponding reference measurement unit 26.

The work position information is set in advance based on a predetermined designed in-passage structure.

The designed in-passage structure is information indicating an ideal structure in the elevator shaft 2 and is expressed by a position and a size using the reference position as a reference (origin point). In other words, the designed in-passage structure is not the actual structure in the elevator shaft 2 but an ideal structure designed in advance by assuming the structure in the elevator shaft 2.

The designed in-passage structure is expressed by a position and a shape using, as a reference, the reference position as the position of the reference line L. The designed in-passage structure information 34B indicating the designed in-passage structure is stored in the storage unit 34 in advance (refer to FIG. 3).

Figure 4:
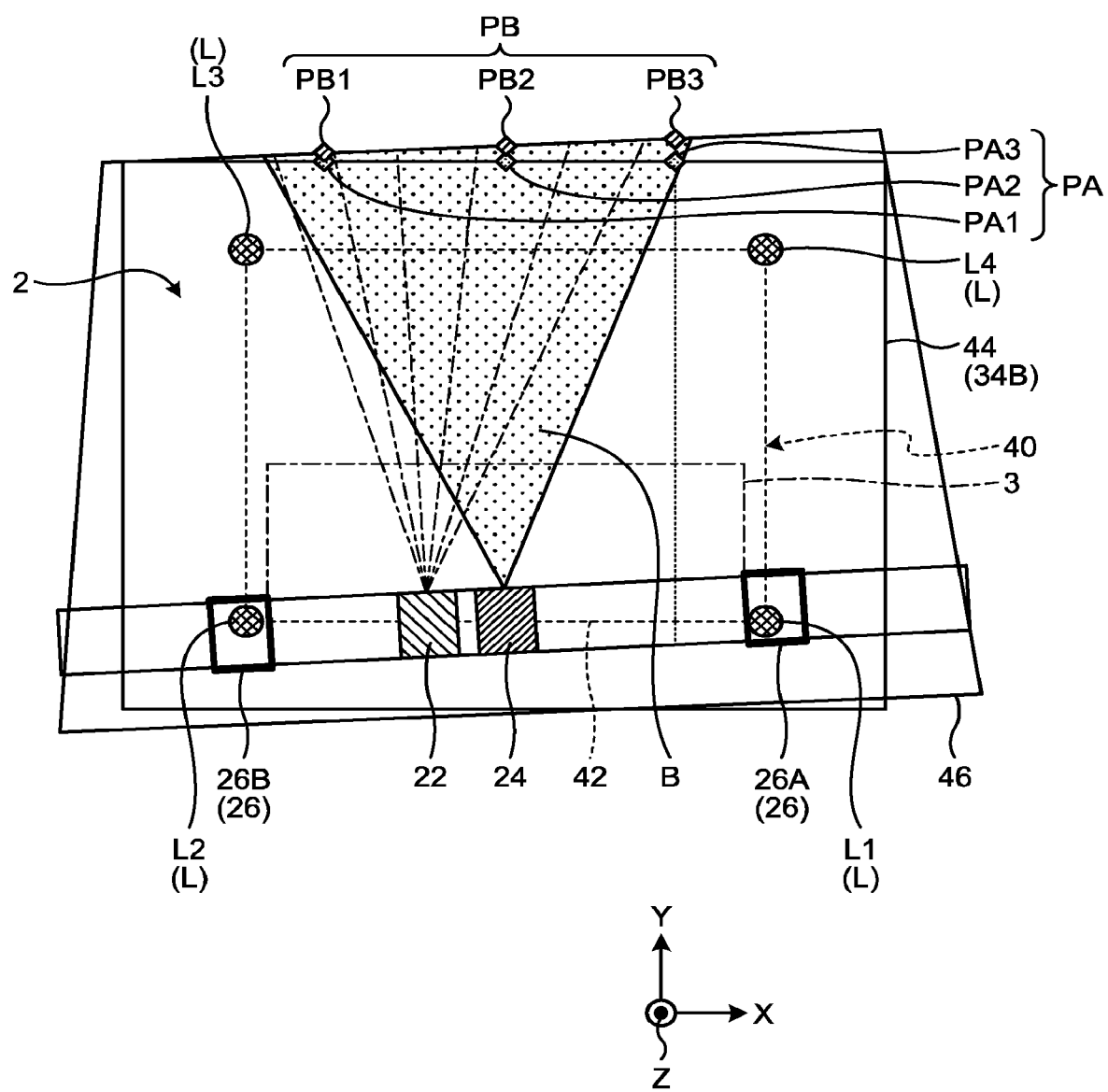
FIG. 4 is a section pattern diagram of an elevator shaft according to an embodiment.

FIG. 4 is a pattern diagram illustrating an exemplary section (section in the intersection direction XY) of the elevator shaft 2, which is orthogonal to the extension direction Z.

As illustrated in FIG. 4, for example, a designed passage wall 44 as part of the designed in-passage structure is expressed in a coordinate system that is arranged at a position with reference to a reference frame 40 having a predetermined shape and including, as a side, a line 42 connecting two reference lines L (for example, the reference lines L1 and L2) adjacent to each other in the intersection direction XY and is calculated from the reference frame. The reference frame 40 is, for example, a rectangular frame expressed by four sides for which the two reference lines L adjacent to each other are connected each other among the four reference lines L (the reference line L1, the reference line L2, the reference line L3, and the reference line L4). The arrangement of the designed in-passage structure at a work site is determined by, for example, setting the position of L2 to be (X,Y)=(0,0), a straight line extending from L2 toward L1 to be the X direction of the coordinate system, and a straight line extending from L2 toward L3 to be the Y direction of the coordinate system.

The reference frame 40 and the designed passage wall 44 are not limited to a rectangular frame expressed by four sides. In addition to the designed passage wall 44, the designed in-passage structure includes designed values of a rail bracket, a guide rail, a boarding opening, and the like as structures attached in the passage as the elevator shaft 2.

In the present embodiment, the work position information is expressed by information indicating a work position PA arranged on the designed passage wall 44 with reference to the reference frame 40. FIG. 4 illustrates three work positions PA (work positions PA1 to PA3) as an example. The work position information is not necessarily limited to information arranged on the designed passage wall. In addition to the information on the passage wall, the work position information includes information of machining and work positions related to a rail bracket, a guide rail, and a boarding opening as structures attached in the passage.

The description continues with reference to FIG. 3. In the process management information 34A, work position information indicating the work position PA as a position on the designed passage wall 44 is registered in association with a work process in advance.

The specifying unit 32A specifies the work process ID of a work process at the earliest work order among work processes in the work state of "work yet to be done" in the process management information 34A. Then, the specifying unit 32A may specify, from the process management information 34A, the work position information of the work process corresponding to the specified work process ID. The specifying unit 32A may specify, as the next work process, a work process selected from among the work processes in the work state of "work yet to be done" based on an operation instruction through the input unit 20B or the switch 20C by the user M. Then, the specifying unit 32A may specify, from the process management information 34A, the work position information corresponding to the specified work process.

Having specified the work position information, the specifying unit 32A controls the displacement member 5 to move the workbench 3 to the corresponding position on the elevator shaft 2 in the extension direction Z, which is indicated by the specified work position information. Under the control, the displacement member 5 moves the workbench 3 in the extension direction Z so that the position of the workbench 3 in the extension direction Z is moved to the vicinity of the position of the work position PA indicated by the specified work position information in the extension direction Z. This control may be executed by any functional component of the control unit 32 and does not necessarily need to be executed by the specifying unit 32A. For example, the control may be executed by the drive control unit 32G.

The first acquisition unit 32B acquires the observation information of the inside of the elevator shaft 2. For example, the first acquisition unit 32B outputs a signal indicating an observation instruction to the surrounding measurement unit 22. Having received the signal, for example, the surrounding measurement unit 22 acquires a captured image of the inside of the elevator shaft 2 by image capturing, and outputs the captured image as the observation information to the main control unit 30. The first acquisition unit 32B acquires the observation information from the surrounding measurement unit 22.

The second acquisition unit 32C acquires reference position information of a predetermined reference position in the elevator shaft 2. For example, the second acquisition unit 32C outputs a signal indicating a measurement instruction to each reference measurement unit 26. Having received the signal, the reference measurement unit 26 measures the position of the corresponding reference line L and outputs the measured position to the main control unit 30 as the reference position information indicating some or all positions of the reference frame 40. The second acquisition unit 32C acquires the reference position information from the reference measurement unit 26.

The structure calculation unit 32D calculates the in-passage structure of the elevator shaft 2.

The following description will be made with reference to FIG. 4. As illustrated in FIG. 4, a passage wall 46 as part of the in-passage structure is an actual structure of the elevator shaft 2. As described above, the designed passage wall 44 is not an actual structure in the elevator shaft 2 but is an ideal structure designed by assume the structure in the elevator shaft 2 in advance. Accordingly, there are cases where the designed passage wall 44 is of a structure different from the passage wall 46 as an actual structure in the elevator shaft 2.

As such, the structure calculation unit 32D calculates the passage wall 46 as part of the in-passage structure by determining the position and posture of the passage wall 46 as an actual structure of the elevator shaft 2.

The structure calculation unit 32D calculates the passage wall 46 with reference to the reference position (position of the reference line L) based on the observation information of the inside of the elevator shaft 2, which is acquired by the first acquisition unit 32B, and the reference position information acquired by the second acquisition unit 32C.

Specifically, the structure calculation unit 32D calculates the passage wall 46 by performing coordinate transform from the position of each observation point indicated by the observation information of the inside of the elevator shaft 2, which is acquired by the first acquisition unit 32B, to a position with reference to the reference position (position of the reference line L).

As a result, disposition of the passage wall 46 as a structure at a cross-section of the elevator shaft 2 in the intersection direction XY is acquired based on the observation information and the reference position information. The description is made only for an XY section but is also applicable to a case in which three-dimensional data having information also in the Z direction is used.

The function of the structure calculation unit 32D may be mounted on the measurement unit 23, and the measurement unit 23 may measure the in-passage structure (passage wall 46).

The description continues with reference to FIG. 3. The correction unit 32E calibrates, based on the designed passage wall 44 and the passage wall 46, the work position information of the work position PA set based on the designed passage wall 44 to corrected work position information.

The following description is made with reference to FIG. 4. Specifically, the correction unit 32E corrects the work position information of the work position PA to the corrected work position information of a corrected work position PB so that the work position PA arranged on the designed passage wall 44 with reference to the reference frame 40 becomes a corresponding position (corrected work position PB) on the structure of the passage wall 46.

For example, the correction unit 32E calculates, by a method such as coordinate transform, a function for matching the reference frame as a reference for the designed passage wall 44 with the reference position information as a reference for the passage wall 46. Then, the correction unit 32E inputs the work position information of the work position PA as each position on the reference frame of the designed passage wall 44 to the function so that each work position PA is made to correspond to the actual position in the elevator shaft 2. In addition, the correction unit 32E calculates, based on the designed passage wall 44 and the passage wall 46, the corrected work position information indicating the corrected work position PB corresponding to the work position PA.

As for a correction method, for example, consider a case in which the work point position PA illustrated in FIG. 4 is a work point at which drilling is performed in the Y direction. In this case, the corrected work position PB is set to be a point where, when shifting the work point position PA in the Y direction, the work position PA intersects the position of the passage wall 46 obtained from measurement and calculation result. When each corrected work position is determined in this manner, the interval of the corrected work positions PB of work points in the X axial direction matches with the interval of the work positions PA in the X axial direction. As a result, when a component such as a bracket is attached to a plurality of drilled holes, the component can be attached along the X and Y directions in designing, thereby achieving more accurate installation work.

In this manner, the work positions PA1 to PA3 illustrated in FIG. 4 are corrected to corrected work positions PB1 to PB3 as positions on an actual structure in the elevator shaft 2.

The correction unit 32E stores the corrected work position information after the correction in association with the corresponding work process ID of the process management information 34A. In this case, the correction unit 32E may update the work position information by overwriting the corrected work position information to the work position information associated with the corresponding work process ID of the process management information 34A.

The description continues with reference to FIG. 3. The irradiation control unit 32F controls the irradiation unit 24 to emit light indicating a work region to the corrected work position PB of the corrected work position information corrected by the correction unit 32E.

For example, the irradiation control unit 32F controls the irradiation unit 24 to emit, to the corrected work position PB indicated by the corrected work position information in the elevator shaft 2, light indicating that the corrected work position PB is a work region as a work target.

Consider a case in which the irradiation unit 24 is a projector. In this case, the irradiation unit 24 projects an image indicating a work region to the corrected work position PB. Consider a case in which the irradiation unit 24 is a laser pointing device. In this case, the irradiation unit 24 emits a laser beam to the corrected work position PB under control of the irradiation control unit 32F.

Light emitted from the irradiation unit 24 is shielded by the reference line L and does not reach an outer frame indicated by the designed passage wall 44 in some cases. Thus, the position of the irradiation unit 24 may be configured to be movable. For example, the position of the irradiation unit 24 relative to the base unit 12 may be configured to be movable. Then, the irradiation control unit 32F may control the irradiation unit 24 to move to a position where light to be emitted from the irradiation unit 24 is not shielded by the reference line L, and then control the irradiation unit 24 to emit light indicating a work region to the corrected work position PB.

Figure 5:
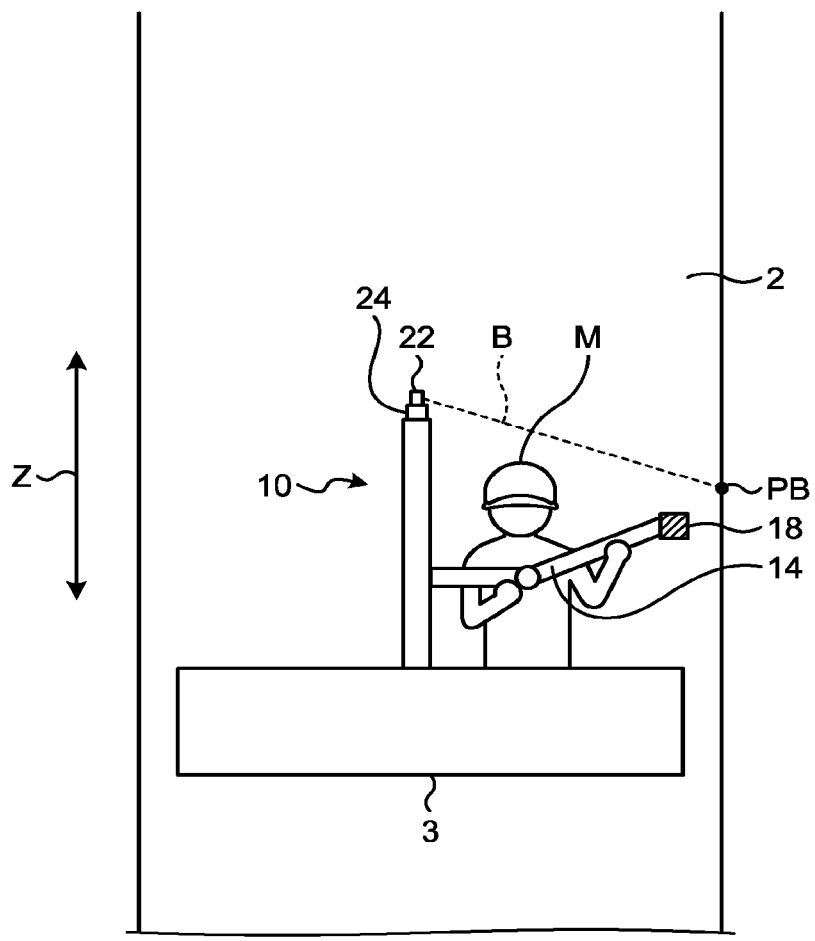
FIG. 5 is a pattern diagram illustrating a state in which light is emitted to a corrected work position according to an embodiment.

In this manner, light indicating a work region is incident on the corrected work position PB after the correction in accordance with the passage wall 46 as an actual structure of the elevator shaft 2. FIG. 5 is a pattern diagram illustrating an exemplary state in which light B indicating a work region is incident on the corrected work position PB.

The user M can perform work such as attachment of the member 18 to the elevator shaft 2 while checking the corrected work position PB irradiated with the light B. In addition, a work load on the user M is reduced by making the arm 14 to hold the member 18.

The description continues with reference to FIG. 3. The drive control unit 32G controls the drive unit 21 so that the holding unit 14B of the arm 14 moves closer to the corrected work position PB of the corrected work position information after correction by the correction unit 32E. Then, the drive control unit 32G controls the drive unit 21 so that driving of the arm 14 is restricted in a region in a predetermined range from the corrected work position PB.

For example, the drive control unit 32G senses, through the sensor 16, a load due to the weight of a tool or a member held by the holding unit 14B or the like, and controls the arm 14 so that the arm 14 supports the load. By this controlling, when the tool or the member is heavy, a worker can move the tool or the member with small force. The tool is an exemplary member held by the holding unit 14B and is, for example, a work tool such as a drill.

When the sensor 16 detects that the holding unit 14B reaches the region in the predetermined range from the corrected work position PB, the arm 14 is controlled to restrict or fix the posture and motion of the arm 14 by braking until work completion is determined upon an operation instruction by the user M.

Accordingly, while the user M is performing work on the corrected work position PB, disturbance due to motion of the arm 14 can be prevented from occurring to the work.

In addition, the worker can be aided to more accurately and easily perform work by restricting the posture and motion of the arm 14 only to a certain direction or changing an operation load depending on the direction. Specifically, at drilling, controlling is performed that movement is allowed with light force only in a drilling direction but with heavy force in a direction orthogonal to the drilling.

The update unit 32H updates the process management information 34A. Specifically, after the irradiation unit 24 is controlled to emit light indicating a work region to the corrected work position PB, the update unit 32H updates, in the process management information 34A, the work state information corresponding to the work process information of the corrected work position irradiated with the light to information indicating "work completed".

For example, the update unit 32H determines that the work is ended (i.e. completed) when a signal indicating work end is input through an operation instruction by the operation handle 14C or on the UI unit 20 by the user M after the irradiation unit 24 is controlled to emit light indicating a work region to the corrected work position PB. Then, when the work is determined to be ended, the update unit 32H may update, in the process management information 34A, the work state information corresponding to the work process information of the corrected work position irradiated with the light to information indicating "work completed".

The output control unit 32I displays the process management information 34A on the display 20A. For example, the output control unit 32I may display the process management information 34A on the display 20A at at least one of the timing when the next work process is specified by the specifying unit 32A, the timing when the work position PA is corrected by the correction unit 32E, the timing when light indicating a work region is emitted by the irradiation control unit 32F, and the timing when the process management information 34A is updated by the update unit 32H.

Accordingly, the user M can perform work while visually recognizing the process management information 34A displayed on the display 20A.

The output control unit 32I may output the process management information 34A to the external device 11 through the communication unit 29. In this case, the user visually recognizing the external device 11 can easily check the work state at the work support device 10 by checking the process management information 34A. In addition, the output control unit 32I may transmit, to the external device 11 through the communication unit 29 and the network N, at least one of the observation information acquired by the first acquisition unit 32B, the reference position information acquired by the second acquisition unit 32C, the in-passage structure information of the passage wall 46 calculated by the structure calculation unit 32D, the corrected work position information of the corrected work position PB, and the updated process management information 34A.

The following describes the process of basic work support processing executed by the work support device 10 according to the present embodiment.

Figure 6:
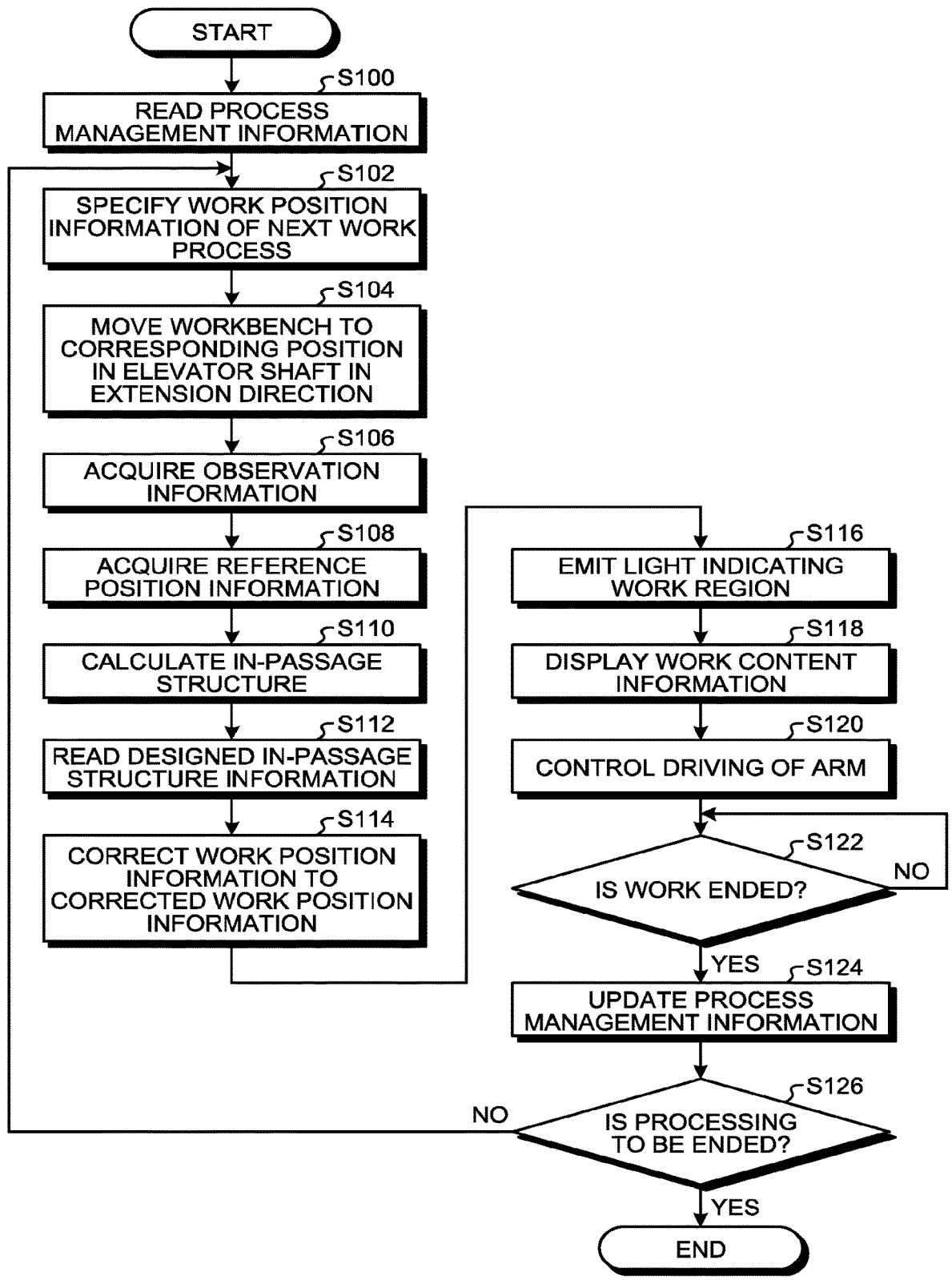
FIG. 6 is a flowchart illustrating an exemplary process of work support processing according to an embodiment.

FIG. 6 is a flowchart illustrating an exemplary process of the work support processing executed by the work support device 10.

For example, the user M grasps the member 18 and causes the holding unit 14B to hold the member 18. Subsequently, the user M inputs a signal indicating work support start by operating the switch 20C or the input unit 20B. Then, the work support device 10 executes the work support processing indicated by the flowchart illustrated in FIG. 6.

Through the operation of the switch 20C, an operation mode of the work support system 1 may be switchable to an automatic mode in which the work support system 1 executes the work support processing or a manual mode in which the user M manually operates the arm 14. In this case, the work support system 1 may execute the work support processing illustrated in FIG. 6 when switching from the manual mode to the automatic mode is instructed through the operation of the switch 20C by the user M.

The specifying unit 32A reads the process management information 34A (step S100). Then, the specifying unit 32A specifies the work position information of the next work process from the process management information 34A read at step S100 (step S102). For example, the specifying unit 32A specifies the work process ID of a work process at the earliest work order among work processes in the work state of "work yet to be done" in the process management information 34A. Then, the specifying unit 32A specifies, from the process management information 34A, the work position information of the work process corresponding to the specified work process ID.

Subsequently, the specifying unit 32A controls the displacement member 5 to move the workbench 3 to the corresponding position in the elevator shaft 2 in the extension direction Z, which is indicated by the work position information specified at step S102 (step S104). Through the processing at step S104, the workbench 3 is moved to the vicinity of the position indicated by the work position information in the extension direction Z. The specifying unit 32A preferably controls the outrigger unit 28 so that the workbench 3 moved to the position is fixed at the position.

Subsequently, the first acquisition unit 32B acquires the observation information of the inside of the elevator shaft 2 from the surrounding measurement unit 22 (step S106). For example, the first acquisition unit 32B acquires the observation information from the surrounding measurement unit 22 by outputting a signal indicating an observation instruction to the surrounding measurement unit 22.

Subsequently, the second acquisition unit 32C acquires the reference position information from each reference measurement unit 26 (step S108). For example, the second acquisition unit 32C acquires the reference position information from the reference measurement unit 26 by outputting a signal indicating a measurement instruction to the reference measurement unit 26. The order processing of steps S106 and S108 is not limited to the stated order.

Subsequently, the structure calculation unit 32D calculates the passage wall 46 as an actual structure in the elevator shaft 2 by using the observation information acquired at step S106 and the reference position information acquired at step S108 (step S110).

Subsequently, the correction unit 32E reads, from the storage unit 34, the designed in-passage structure information 34B of the designed passage wall 44 as an ideal structure designed by assuming the structure in the elevator shaft 2 in advance (step S112).

The correction unit 32E corrects, based on the designed passage wall 44 read at step S112 and the passage wall 46 calculated at step S110, the work position information of the work position PA set based on the designed passage wall 44 to the corrected work position information (step S114).

Subsequently, the irradiation control unit 32F controls the irradiation unit 24 to emit light indicating a work region to the corrected work position PB of the corrected work position information after the correction at step S114 (step S116).

The output control unit 32I displays the process management information 34A on the display 20A (step S118). For example, the output control unit 32I reads, from the process management information 34A, the work content information corresponding to the work position information specified at step S102, and displays the work content information on the display 20A. Thus, the user M can check the work content by visually recognizing the display 20A.

Subsequently, the drive control unit 32G controls the drive unit 21 so that the holding unit 14B of the arm 14 moves closer to the corrected work position PB of the corrected work position information after the correction at step S114. In addition, the drive control unit 32G controls the drive unit 21 so that driving of the arm 14 is restricted in the region in the predetermined range from the corrected work position PB (step S120).

Subsequently, the update unit 32H determines whether the work of the work process corresponding to the work position information specified at step S102 is ended (step S122). For example, the update unit 32H determines that the work is ended when a signal indicating work end is input through an operation instruction by the operation handle 14C or on the UI unit 20 by the user M after the processing at step S116 is executed.

The update unit 32H repeats the negative determination (No at step S122) until the positive determination is performed at step S122 (Yes at step S122). Then, if the positive determination is performed (Yes at step S122), the process proceeds to step S124.

At step S124, the update unit 32H updates the process management information 34A (step S124). The update unit 32H updates, in the process management information 34A, the work state information corresponding to the work process information of the corrected work position irradiated with light to information indicating "work completed".

Subsequently, the control unit 32 determines whether to end the work support processing (step S126). For example, the control unit 32 determines that the work support processing is to be ended when all work content information corresponding to a work ID included in the process management information 34A indicates "work completed". In addition, the control unit 32 may determine that the work support processing is to be ended when having received a signal indicating work support end through an operation instruction on the input unit 20B or the switch 20C by the user M or an instruction signal received from the external device 11.

If the negative determination is performed at step S126 (No at step S126), the process returns to the above-described step S102. On the other hand, if the positive determination is performed at step S126 (Yes at step S126), the present routine is ended.

Figure 7:
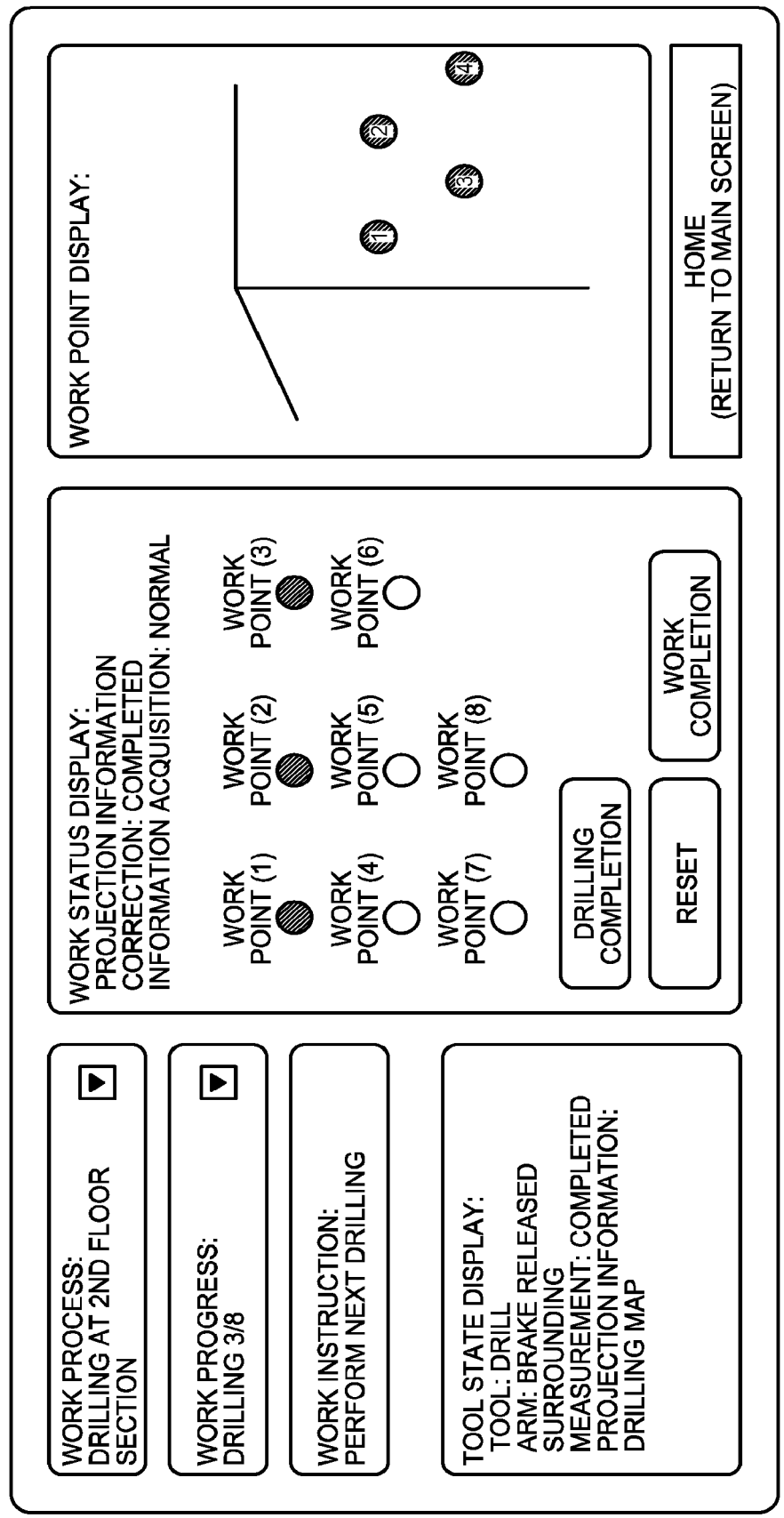
FIG. 7 is a pattern diagram of a UI according to an embodiment.

FIG. 7 is a pattern diagram illustrating exemplary display displayed on the UI unit 20. The UI unit 20 displays the states of a work process, a work progress, a work instruction, the arm 14, and a tool. In addition, the UI unit 20 displays the work status and the situation of a work point (spot P) where the work is performed. The user can switch displayed screens by performing change of the work process or the work progress, correction of the tool state display, update of the work status, an instruction on a home button, or the like through, for example, a touch operation on the UI unit 20. Display of the work status and the work progress is updated by the output control unit 32I in accordance with, for example, end determination at each step in the flowchart described with reference to FIG. 6 or a result obtained by the sensor 16. By such displaying and an automatic update function, the worker can obtain information necessary for the work without excess work.

Specific Example of Tool Holding by Work Support System 1 1

The following describes a specific process of work support when work is performed while a tool is held by the holding unit 14B.

Figure 8:
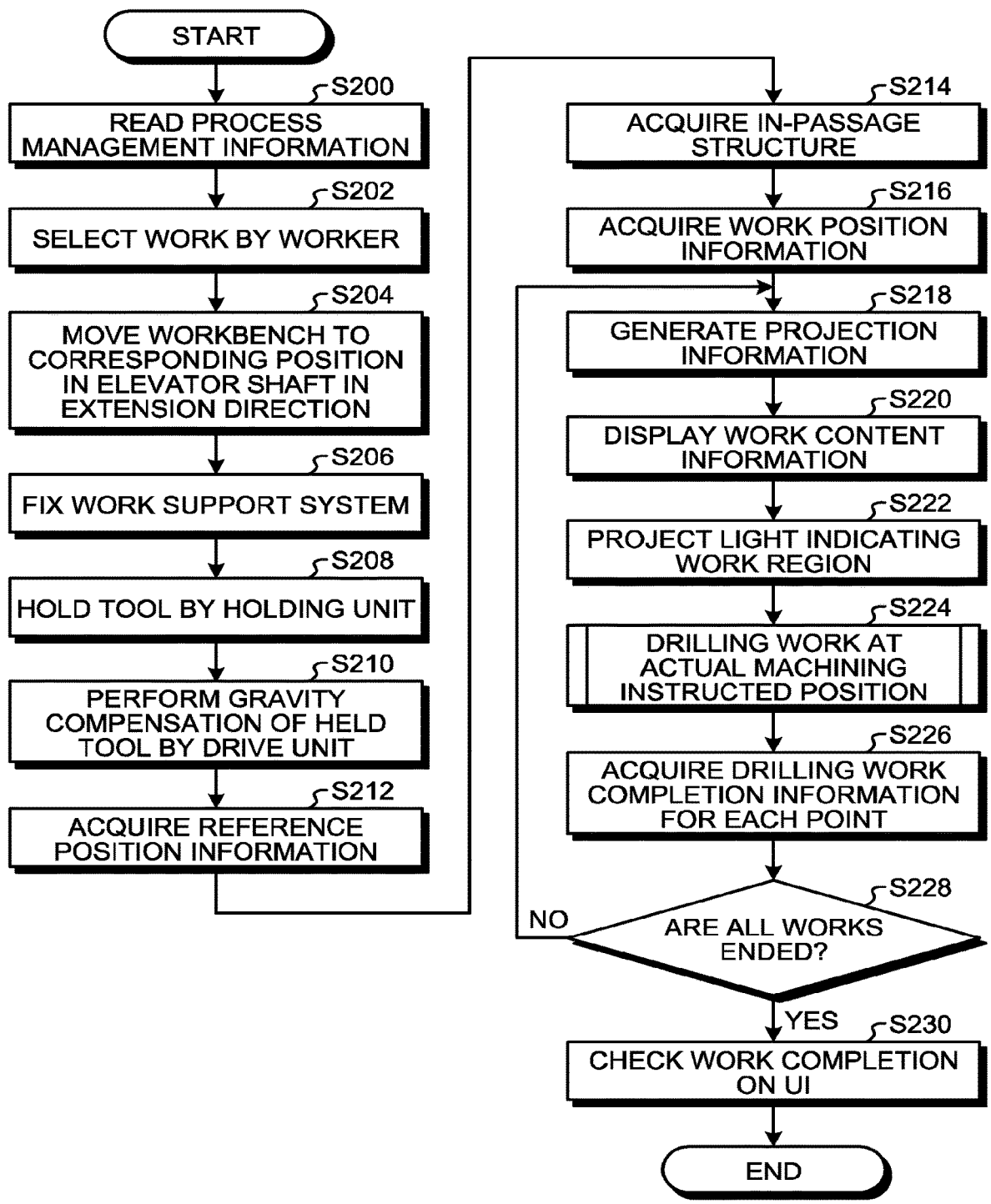
FIG. 8 is a flowchart illustrating an exemplary process of the work support processing involving tool holding according to an embodiment.

FIG. 8 is a flowchart illustrating an exemplary process of work support processing executed by the work support system 1 when drilling work using a drill is performed by using the work support system 1. FIG. 8 illustrates the exemplary process of the work support processing when the work is performed with the drill as a tool being attached to the work support system 1.

First, the control unit 32 acquires necessary information by reading designing information and installation information of a building from a higher-level system (step S200). These pieces of information include information necessary for drilling, such as the number of holes to be drilled, drilling positions, the kinds of holes to be drilled, specifications of holes to be drilled, and a recommended tool to be used. When the work support system 1 (work support device 10) is not connected with higher-level system on line, the control unit 32 may acquire the above-described necessary information from data acquired by the storage unit 34 in advance.

Subsequently, the worker operates the UI unit 20 to select work to be performed (step S202). For example, it is assumed in the following description that the worker selects drilling work from among works such as drilling, bracket attachment, guide rail attachment.

Subsequently, the worker operates a gondola as the workbench 3 based on information acquired by referring to the UI unit 20 to vertically move the workbench 3 toward a height at which the work needs to be performed (step S204). When determined that the gondola reaches a predetermined position, the control unit 32 updates display of the UI unit 20 to display information that prompts the worker to input an instruction such as a stop request.

Subsequently, when the work support system 1 installed on the gondola as the workbench 3 has moved to a height desired by the worker, the outrigger unit 28 is operated through determination by the control unit 32 or an operation instruction by the worker so that the work support system 1 is fixed in the elevator shaft 2 (step S206). The fixation is performed when the expansion-contraction part of the outrigger unit 28 expands and is pressed against, for example, a flat surface of the elevator shaft 2 or a frame attached to the elevator shaft 2.

Subsequently, when holding no tool, the holding unit 14B is caused to hold a necessary tool such as a drill (step S208). This work is unnecessary when the holding unit 14B already holds a tool. Information indicating the holding state of the tool, such as a result of pressure detection by the sensor 16B provided to the holding unit 14B is transmitted from the sensor 16B to the control unit 32.

The control unit 32 performs initialization operation of gravity compensation of the held tool When determined that the tool is surely held by the holding unit 14B based on the information indicating the holding state of the tool and received from the sensor 16B, or in accordance with an operation on the operation handle 14C or the UI unit 20 by the worker.

The drive control unit 32G calculates a load generated due to the weight of the tool held by the holding unit 14B from information such as the current values of the sensors (the sensor 16A, the sensor 16C, and the sensor 16B) provided to the joints of the arm 14 and the current value of the drive unit 21 that drives each joint, and causes the drive unit 21 to generate drive power to support the load (step S210).

As a result, the worker can move the tool to a desired position or posture without feeling the load by the weight of the tool.

Subsequently, the second acquisition unit 32C acquires the reference position information from each reference measurement unit 26 (step S212). At step S212, the second acquisition unit 32C acquires the reference position information indicating the reference position by acquiring, from the reference measurement unit 26, a result of measurement of the position of the corresponding reference line L as a reference, such as a piano wire.

For example, consider a case in which the reference position is the reference lines L that are four piano wires respectively stretched to the apexes of a rectangle. In this case, at least two (for example, the reference lines L1 and L2) of the piano wires are measured, the position of one of the piano wires is set to be the origin, the X direction is set to be along a line segment extending from the origin toward the other piano wire, and the Y direction is set to be a direction orthogonal to the X direction. Through this processing, the second acquisition unit 32C can obtain reference position and posture in a section plane of the elevator shaft 2.

Subsequently, the structure calculation unit 32D acquires the in-passage structure as an actual structure in the elevator shaft 2 (step S214). Specifically, the measurement unit 23 measures surrounding measurement information as information of the in-passage structure, in other words, the actual position of the wall surface of the actual elevator shaft 2 or a circumferential structure, and the actual posture thereof such as tilt.

Subsequently, the correction unit 32E maps the designed in-passage structure information 34B of, for example, an ideal structure of the elevator shaft 2 or an ideal circumferential structure thereof such as a frame, which is acquired from a higher-level unit, by using the reference position information obtained at step S212 as a starting point. In addition, the correction unit 32E acquires, from the installation information, the work position information of a work point on the elevator shaft 2 or the circumferential structure, such as a drilling position, which is necessary for installation (step S216). The correction unit 32E can calculate, from these pieces of information, an ideal work point (work position information) when viewed from the reference position. When determined that the reference position needs to be offset based on the surrounding measurement information obtained by the measurement unit 23, the correction unit 32E offsets the reference position.

Subsequently, for the work position information as the calculated ideal work point, the correction unit 32E corrects tilt and positional shift of the wall surface position, which are obtained by the reference measurement unit 26, calculates the corrected work position information as the actual work point, and generates projection information as the corrected work position information additionally including, for example, correction of distortion of an optical system of the irradiation unit 24 as a projection unit that performs projection (step S218).

Subsequently, the UI unit 20 displays information of the contents of work to be performed by the worker (step S220). For example, the UI unit 20 displays instruction information for performing drilling work at a specified position.

Subsequently, the irradiation unit 24 projects light indicating the actual work position onto the corrected work position PB on the wall surface in the elevator shaft 2 by using the projection information generated at step S218 (step S222).

Following a work instruction displayed on the UI unit 20 and the projected light, the worker performs actual work such as drilling work by using the tool held by the holding unit 14B (step S224). In this case, the assist arm 14A and the holding unit 14B generate appropriate assist power in accordance with, for example, an operation of the arm 14 by the worker, the holding state of the tool at the holding unit 14B, and the posture of the assist arm 14A, thereby assisting the work by the worker. This assist control is performed by control of the drive control unit 32G.

Subsequently, the update unit 32H acquires work completion information as a result of determination of whether the work such as drilling at the work point is completed based on determination of matching between the tip of the tool and the work position, which is calculated from the posture of the assist arm 14A, a result of an operation of the assist arm 14A, and a result of an operation of the UI unit 20. When the work completion information indicating work completion is acquired (step S226), the process proceeds to step S228.

The update unit 32H determines whether all planned work is ended (step S228). If it is determined that any work remains (No at step S228), the update unit 32H updates the projection information and information displayed on the UI unit 20 to contents to be worked next, and the process returns to step S218. This update processing prompts the worker to perform the next work.

On the other hand, if the positive determination is performed at step S228 (Yes at step S228), the process proceeds to step S230. At step S230, the worker checks the progress status of the work displayed on the UI unit 20, and inputs a work end instruction (step S230) to end the present routine when there is no problem with the progress status.

Specific example of work assist through driving of assist arm 14A

The following describes a specific process of work support when the worker is assisted to perform work through driving of the assist arm 14A.

Figure 9:
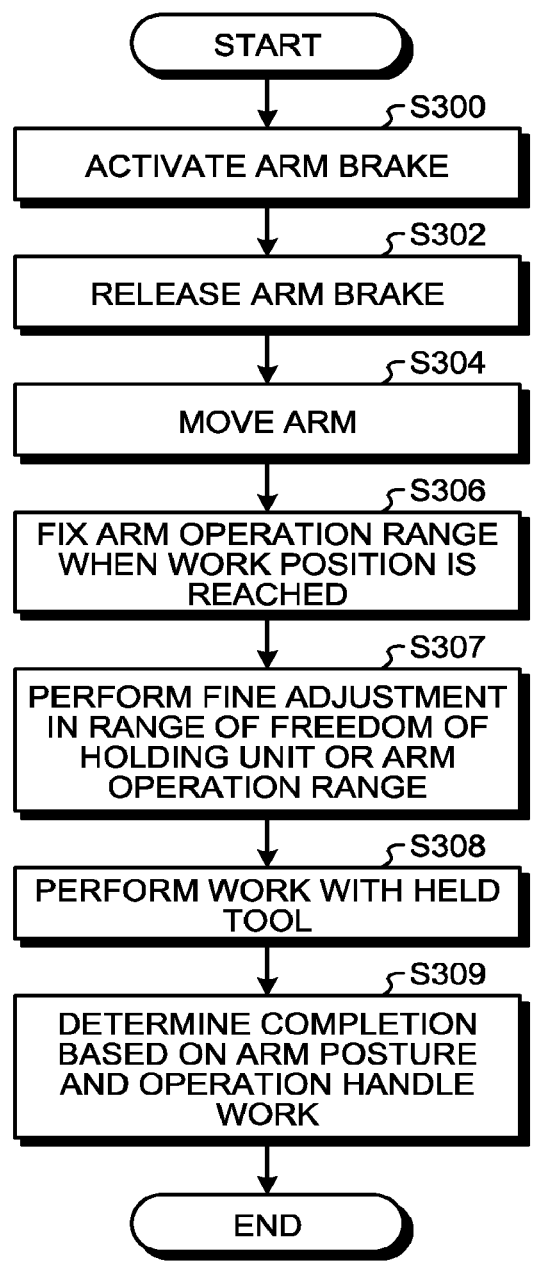
FIG. 9 is a flowchart illustrating an exemplary process of the work support processing according to an embodiment.

FIG. 9 is a flowchart illustrating a detailed process of step S224 in FIG. 8. At step S224, the work support system 1 assists the worker to work by moving a tool.

At start of the work at step S224, all brake mechanisms of the assist arm 14A and the holding unit 14B are turned on for safety (step S300). Accordingly, the tool held by the assist arm 14A and the holding unit 14B is fixed and prevented from moving when external force is applied.

When the control unit 32 determines that the work is started, the drive control unit 32G releases the brake mechanism of the assist arm 14A (step S302).

In accordance with an operation of the arm 14 by the worker, the assist arm 14A moves and the tip of the tool held by the holding unit 14B moves to a work point (step S304). In this case, the assist arm 14A assures the weight of the tool held by the holding unit 14B and performs support by, for example lightening movement when the tool is far from the work point (corrected work position PB), and applying a load on the movement so that the tool can be easily stopped at the target position (corrected work position PB) when the tool comes closer to the work point (corrected work position PB). This support controlling may be performed by controlling of the drive control unit 32G.

When determined that a portion of the assist arm 14A potentially collides and interferes with a surrounding structure, the drive control unit 32G controls the assist arm 14A to perform operation and have a posture for avoiding the collision and the interference. Accordingly, collision and interference of the assist arm 14A with a structure can be avoided.

When determined that the tip of the tool held by the holding unit 14B reaches the vicinity of the work position (corrected work position PB), the drive control unit 32G turns on the brake mechanism of the assist arm 14A to fix the posture of the assist arm 14A (step S306). Alternatively, the drive control unit 32G may restrict movement of the assist arm 14A to fix the tip position thereof to a minute range. Alternatively, the drive control unit 32G may control movement of the assist arm 14A so that the assist arm 14A only slightly moves in a direction parallel to a work surface but freely moves in a direction orthogonal to the work surface. Through these pieces of processing, the work support system 1 supports the work such as drilling to be performed straight (without curving).

Subsequently, the worker operates the tool held by the holding unit 14B and the holding unit 14B to adjust the posture of the tool in the range of freedom of the assist arm 14A restricted in movement (step S307).

Subsequently, the worker performs the work such as drilling while operating, for example, the tool or the switch 20C of the operation handle 14C (step S308).

The update unit 32H determines at which work point of which work process the work is performed based on the postures of the assist arm 14A, the holding unit 14B, and the like. The update unit 32H determines work completion based on, for example, a history of on or off of the operation handle 14C and a load on the assist arm 14A or the like, and an operation result of an instruction for an operation of a completion button through the UI unit 20 or the like (step S309). Then, the present routine is ended.

Specific example of work assist method through driving of assist arm 14A

The following describes generation of information on driving of the assist arm 14A executed by the control unit 32 at the work support by the assist arm 14A described with reference to FIG. 9. The drive information is instruction information for instructing the assist arm 14A to drive.

Figure 10:
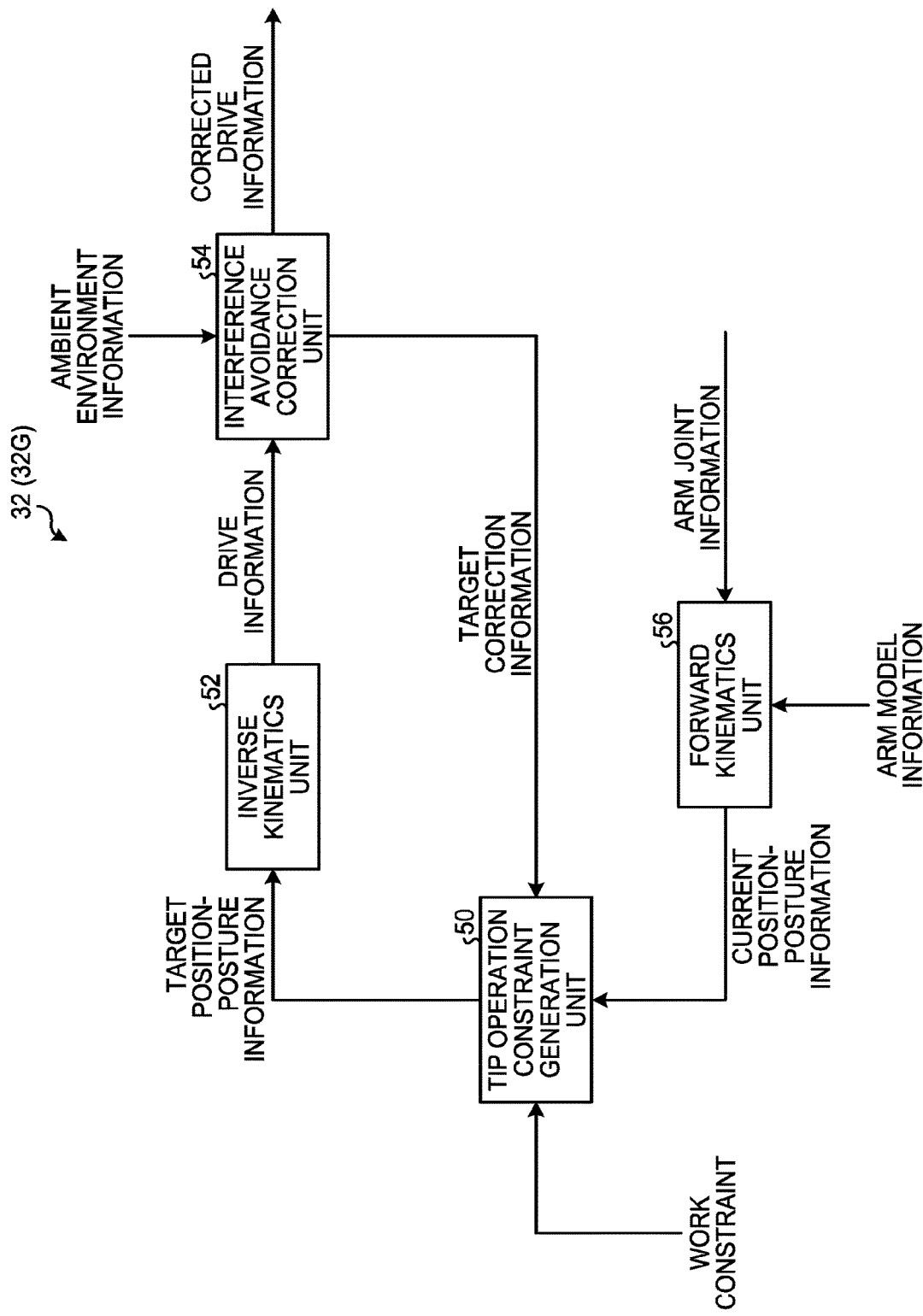
FIG. 10 is a functional block diagram of a drive unit according to an embodiment.

FIG. 10 is an exemplary block diagram of functions used to generate the drive information for the assist arm 14A.

For example, the drive control unit 32G of the control unit 32 includes a tip operation constraint generation unit 50, an inverse kinematics unit 52, an interference avoidance correction unit 54, and a forward kinematics unit 56.

The forward kinematics unit 56 acquires joint information of each joint of the assist arm 14A. The joint information is detected by the sensor 16A such as an encoder provided to the joint of the assist arm 14A. The joint information is, for example, encoder information, a current measured value, or a torque sensor value.

In addition, the forward kinematics unit 56 acquires model information of the assist arm 14A such as joint disposition as disposition of each joint of the assist arm 14A and a link length as the length between the joints.

The forward kinematics unit 56 converts, through quasi kinematics calculation using these pieces of model information, each piece of the joint information as joint motion of the assist arm 14A into position-posture information of a tip such as the tip of the holding unit 14B or the tip of the tool.

The tip operation constraint generation unit 50 generates, from the current tip position-posture information acquired by the forward kinematics unit 56, target position and posture of the tip as target values for driving the assist arm 14A. The tip operation constraint generation unit 50 generates target position and posture of the tip as target values for driving the assist arm 14A in accordance with the size and direction of a load generated on the tip depending on tool weight compensation and the work region.

The inverse kinematics unit 52 converts, through inverse kinematic calculation, the target position and posture of the tip generated by the tip operation constraint generation unit 50 into the drive information as a drive command for each joint of the assist arm 14A.

The interference avoidance correction unit 54 determines, by using the surrounding measurement information measured by the measurement unit 23, whether the assist arm 14A collides or interferes with the surrounding (ambient) environment due to operation of the assist arm 14A. When determined that the interference potentially occurs, the interference avoidance correction unit 54 corrects the drive information of the assist arm 14A. When determined that it is difficult to avoid the interference, the interference avoidance correction unit 54 outputs target correction information for correcting the targets to the tip operation constraint generation unit 50.

In the work support system 1, through these pieces of processing executed by the drive control unit 32G of the control unit 32, the assist arm 14A can be operated so that the worker can smoothly perform work.

The following describes the process of work support when work is performed while a member is held by the holding unit 14B.

Figure 11:
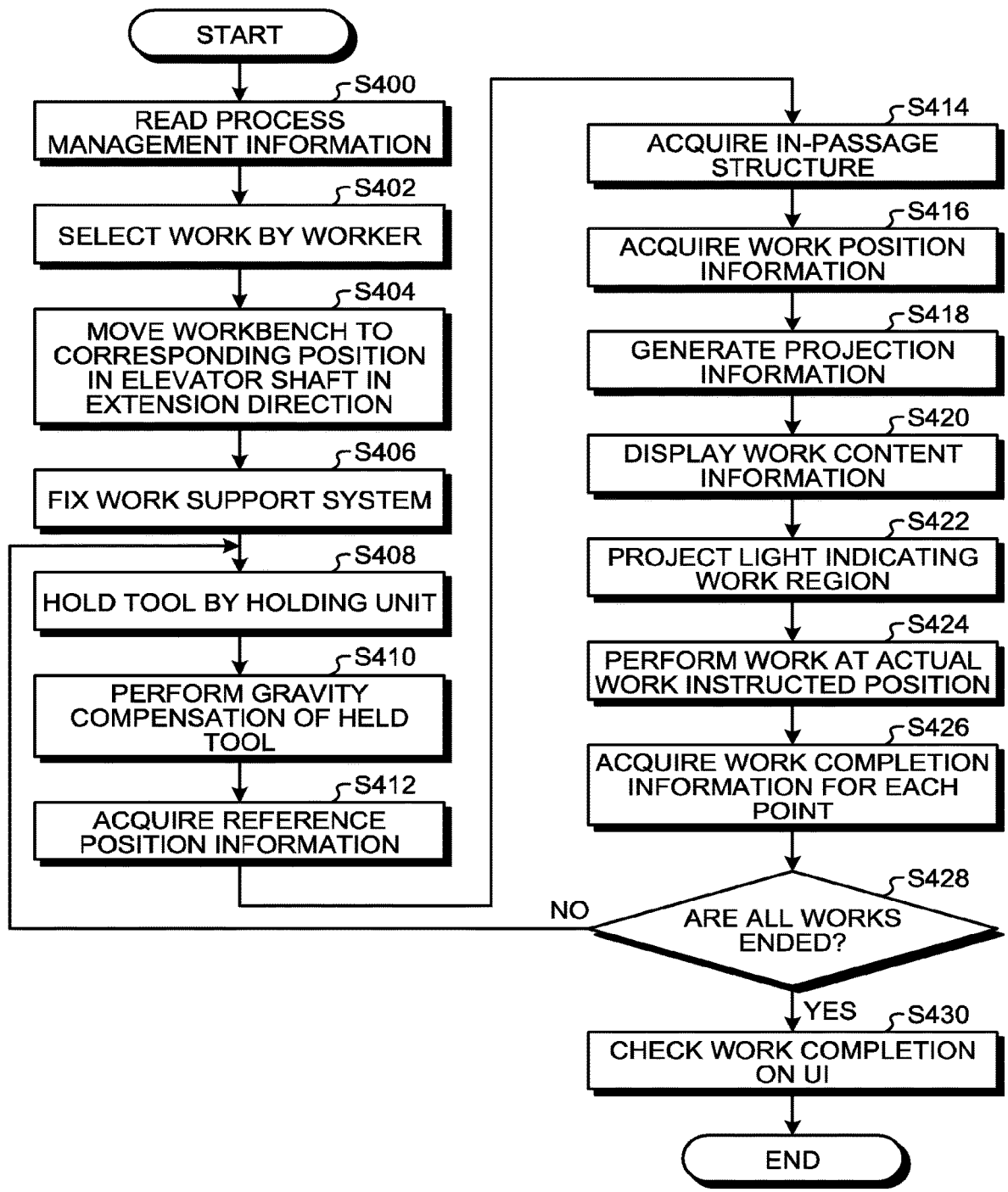
FIG. 11 is a flowchart illustrating an exemplary process of the work support processing involving member holding according to an embodiment.

FIG. 11 is a flowchart illustrating an exemplary process of support processing when work is performed while a bracket as the member is held by the work support system 1.

First, the control unit 32 acquires necessary information by reading designing information and installation information of the building from the higher-level system (step S400). Subsequently, the worker operates the UI unit 20 to select work to be performed (step S402). For example, it is assumed in the following description that the worker selects bracket attachment work from among works such as drilling, bracket attachment, guide rail attachment.

Subsequently, the worker operates the gondola as the workbench 3 based on information acquired by referring to the UI unit 20 to vertically move the workbench 3 toward a height at which the work needs to be performed (step S404). When determined that the gondola reaches a predetermined position, the control unit 32 updates display of the UI unit 20 to display information that prompts the worker to input an instruction such as a stop request.

Subsequently, when the work support system 1 installed on the gondola as the workbench 3 has moved to a height desired by the worker, the outrigger unit 28 is operated through determination by the control unit 32 or an operation instruction by the worker so that the work support system 1 is fixed in the elevator shaft 2 (step S406).

Subsequently, when holding no bracket, the holding unit 14B is caused to hold a bracket (step S408). This work is unnecessary when the holding unit 14B already holds a bracket. Information indicating the holding state of the tool, such as a result of pressure detection by the sensor 16B provided to the holding unit 14B is transmitted from the sensor 16B to the control unit 32.

The control unit 32 performs initialization operation of gravity compensation of the held bracket When determined that the tool is reliably held by the holding unit 14B based on the information indicating the holding state of the bracket and received from the sensor 16B, or in accordance with an operation on the operation handle 14C or the UI unit 20 by the worker.

The drive control unit 32G calculates a load generated due to the weight of the bracket held by the holding unit 14B from information such as the current values of the sensors (the sensor 16A, the sensor 16C, and the sensor 16B) provided to the joints of the arm 14 and the current value of the drive unit 21 that drives each joint, and causes the drive unit 21 to generate drive power to support the load (step S410).

As a result, the worker can move the bracket to a desired position or posture without feeling the load by the weight of the bracket.

Subsequently, processing at steps S412 to S422 is executed. Steps S412 to S422 are same as the above-described steps S212 to S222.

Specifically, the second acquisition unit 32C acquires the reference position information from each reference measurement unit 26 (step S412). Subsequently, the structure calculation unit 32D acquires the in-passage structure as an actual structure in the elevator shaft 2 (step S414). Subsequently, the correction unit 32E maps the designed in-passage structure information 34B of, for example, an ideal structure of the elevator shaft 2 or a surrounding structure such as a frame, which is acquired from the higher-level unit, by using the reference position information obtained at step S412 as a starting point. In addition, the correction unit 32E acquires, from the installation information, the work position information of a work point on the elevator shaft 2 or the circumferential structure, such as a drilling position, which is necessary for installation (step S416).

Subsequently, the correction unit 32E calculates the corrected work position information as the actual work point, and generates projection information as the corrected work position information additionally including, for example, correction of distortion of the optical system of the irradiation unit 24 as a projection unit that performs projection (step S418). Subsequently, the UI unit 20 displays information of the contents of work to be performed by the worker (step S420). Subsequently, the irradiation unit 24 projects light indicating the actual work position onto the corrected work position PB on the wall surface in the elevator shaft 2 by using the projection information generated at step S418 (step S422).

Following a work instruction displayed on the UI unit 20 and the projected light, the worker performs attachment work of the bracket held by the holding unit 14B (step S424). When the attachment work is ended, the worker removes the bracket from the holding unit 14B and resets the assist power of the assist arm 14A to a parameter when no member is held. In this manner, the work support system 1 appropriately controls a support state in accordance with the holding state of the member at the holding unit 14B. Accordingly, the worker can safely perform work.

Subsequently, the update unit 32H acquires the work completion information as a result of determination of whether the attachment work at the work point is completed based on determination of matching between a bracket attachment position and the work position, which is calculated from the posture of the assist arm 14A, a result of an operation of the assist arm 14A, and a result of an operation of the UI unit 20. When the work completion information indicating work completion is acquired (step S426), the process proceeds to step S428.

The update unit 32H determines whether all planned works are ended (step S428). If it is determined that any work remains (No at step S428), the update unit 32H updates the projection information and information displayed on the UI unit 20 to the content to be worked next, and the process returns to step S418.

On the other hand, if the positive determination is performed at step S428 (Yes at step S428), the process proceeds to step S430. At step S430, the worker checks the progress status of the work displayed on the UI unit 20, and inputs a work end instruction (step S430) to end the present routine when there is no problem with the progress status.

Specific example of support involving observation of the holding unit 14B by work support system 1

The following describes a configuration in which support involving observation of the holding unit 14B is performed by the work support system 1.

Figure 12:
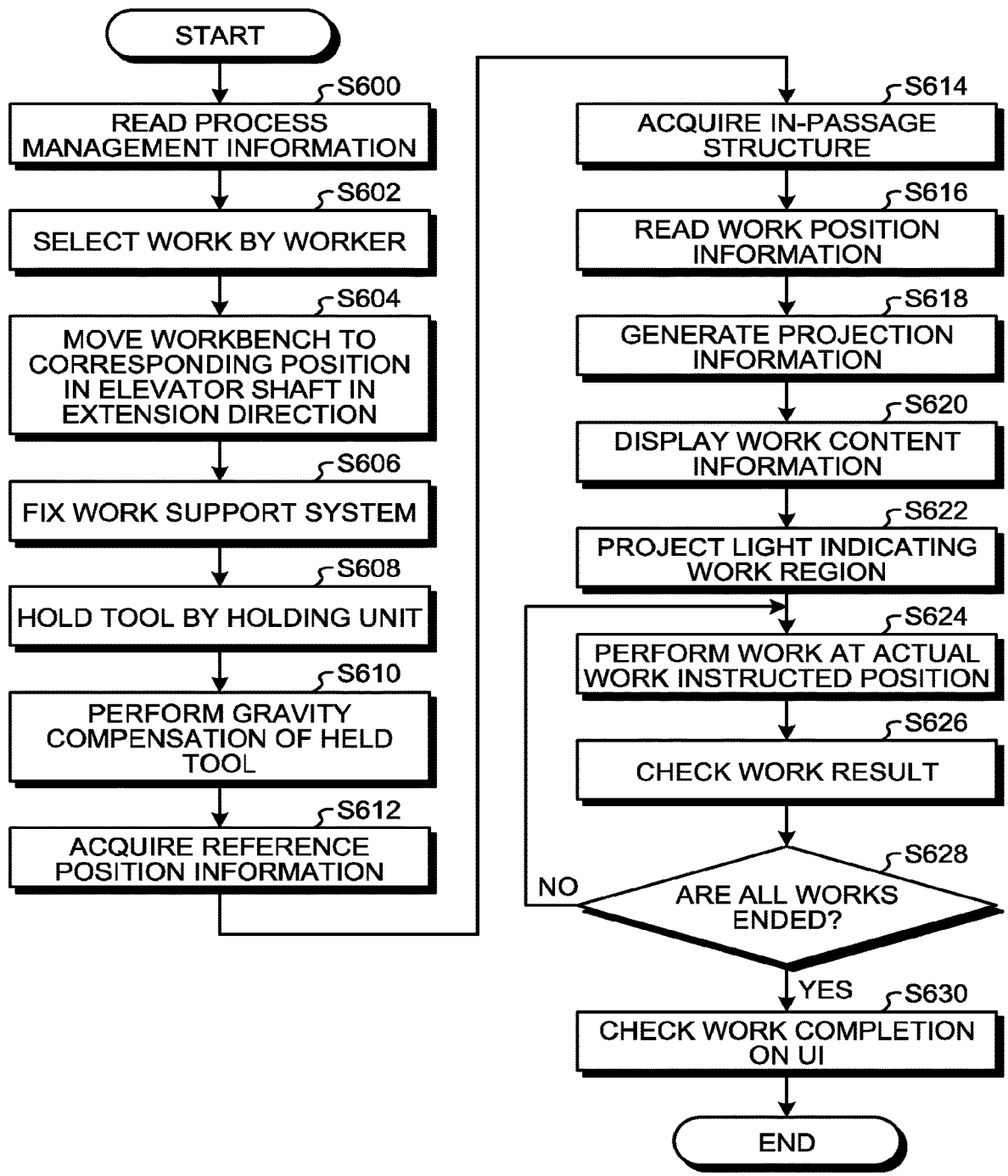
FIG. 12 is a flowchart illustrating an exemplary process of the work support processing involving holder observation according to an embodiment.

FIG. 12 is a flowchart illustrating an exemplary process of support processing when attachment and installation work that requires the position accuracy of an attachment position is performed for, for example, a jamb attached to the boarding opening of the elevator or a jamb as a reference for installation of a piano wire.

First, processing at steps S600 to S622 are executed. Steps S600 to S622 are same as the above-described steps S400 to S420, and thus detailed description thereof is omitted.

Subsequently, following a work instruction displayed on the UI unit 20 and the projected light, the worker performs attachment work of a member such as a jamb (step S624).

Subsequently, the update unit 32H measures the position and posture of each of a surrounding structure and the attached member such as a jamb by using a result of measurement by the measurement unit 23, and determines whether the attachment is performed according to a work plan (step S626). When the attachment is performed according to the work plan, the update unit 32H determines whether all planned work is ended (step S628). If it is determined that the attachment is not performed according to the work plan or any work remains (No at step S628), the update unit 32H updates the projection information and information displayed on the UI unit 20 to contents to be worked next, and the process returns to step S624.

If it is determined that the work is ended (Yes at step S628), the process proceeds to step S630. At step S630, the worker checks the progress status of the work displayed on the UI unit 20, and inputs a work end instruction (step S630) to end the present routine when there is no problem with the progress status.

The following describes each reference line L.

FIGS. 13A to 13D are section pattern diagrams of the elevator shaft 2. FIGS. 13A to 13D are explanatory diagrams of the outline of work support when there is no member, such as a piano wire, that can be used as the reference line L in the elevator shaft 2.

Figure 13A:
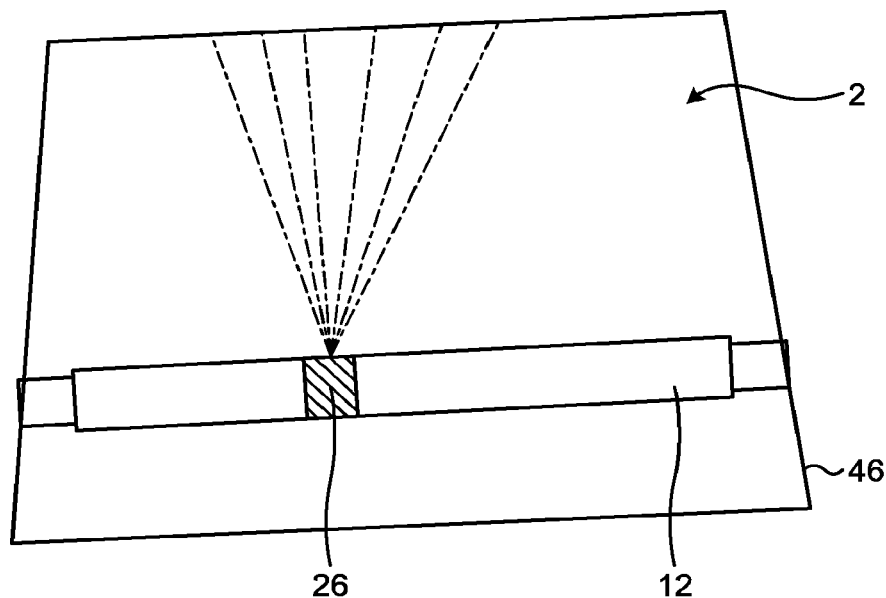
FIG. 13A is a section pattern diagram of the elevator shaft according to an embodiment.
Figure 13B:
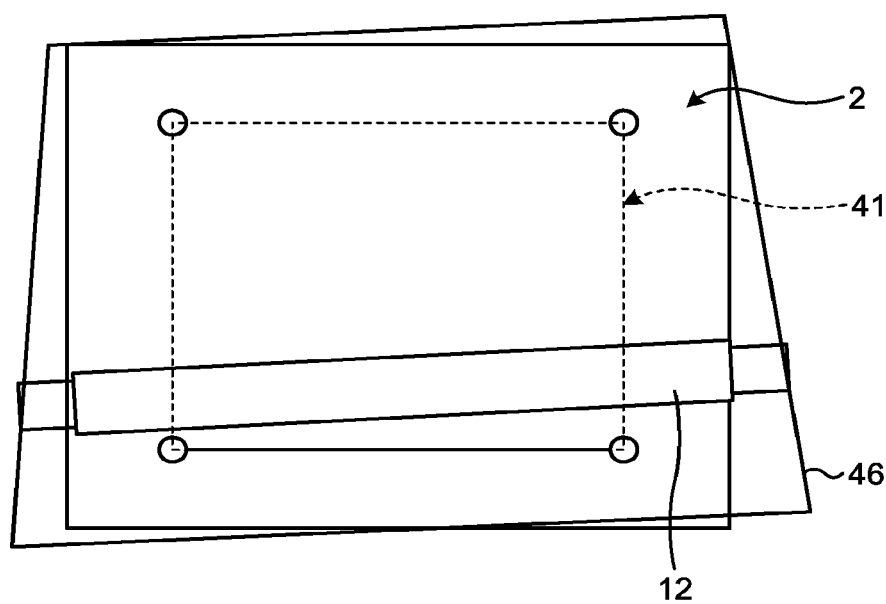
FIG. 13B is a section pattern diagram of the elevator shaft according to an embodiment.
Figure 13C:
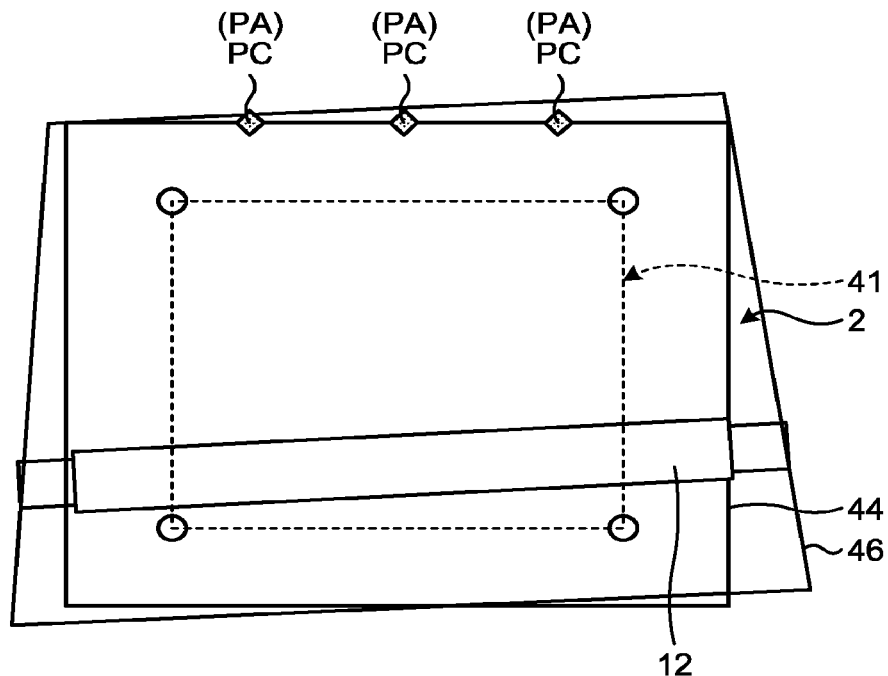
FIG. 13C is a section pattern diagram of the elevator shaft according to an embodiment.
Figure 13D:
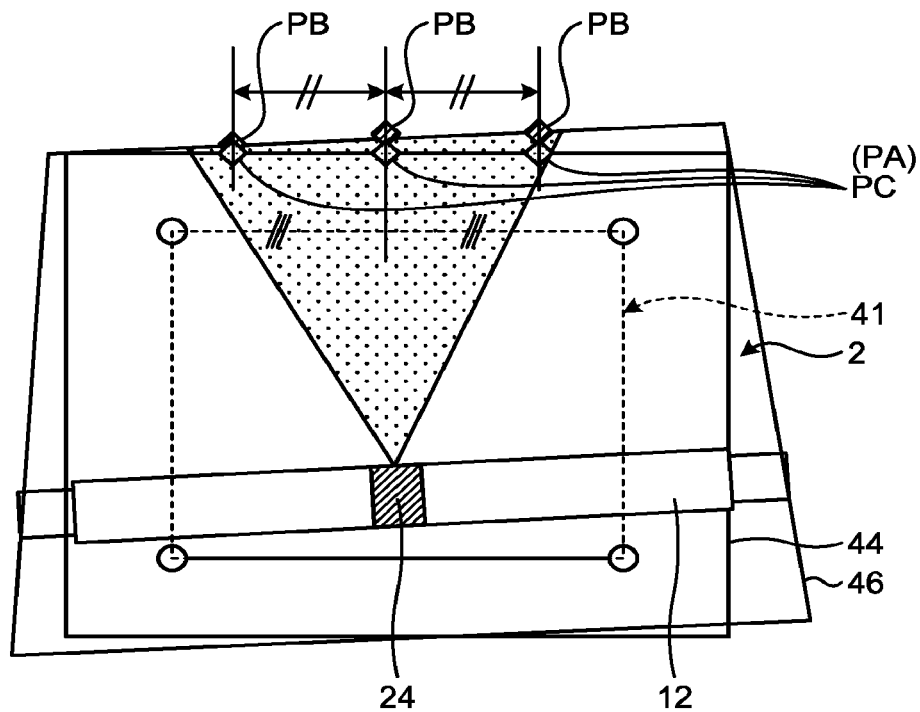
FIG. 13D is a section pattern diagram of the elevator shaft according to an embodiment.

As illustrated in FIG. 13A, the surrounding measurement unit 22 measures a surrounding structure. Subsequently, as illustrated in FIG. 13B, a virtual reference position 41 is determined to maintain a certain distance based on a result of the measurement of the surroundings. Subsequently, as illustrated in FIG. 13C, an ideal work point PC (work position PA) is mapped with reference to the virtual reference position 41. Lastly, as illustrated in FIG. 13D, information projection is performed. Once a reference such as a piano wire is arranged at the virtual reference position determined in FIG. 13B, work can be performed with reference to the reference.

As described above, the work support device 10 according to the present embodiment includes the measurement unit 23 and the irradiation control unit 32F. The measurement unit 23 measures the in-passage structure of a passage. The irradiation control unit 32F controls the irradiation unit 24 to emit light indicating a work region to a corrected work position obtained by correcting, by using a result of the measurement by the measurement unit 23, work position information set based on a predetermined designed in-passage structure.

In this manner, the work support device 10 according to the present embodiment corrects the work position information of the work position PA set based on the designed passage wall 44 as an ideal structure designed by assuming the internal structure of the elevator shaft 2 in advance to the corrected work position information of the corrected work position PB in accordance with the passage wall 46 as an actual structure in the elevator shaft 2. Then, the work support device 10 controls the irradiation unit 24 to emit light indicating a work region to the corrected work position PB.

Accordingly, the user M can perform work in the work region irradiated by the irradiation unit 24, thereby easily performing the work at the highly accurately corrected position in the elevator shaft 2.

Thus, the work support device 10 according to the present embodiment can perform highly accurate work support corresponding to a site status.

The work support device 10 according to the present embodiment further includes the arm 14 configured to hold the member 18. When the arm 14 holds the member 18 as a work target, the work support device 10 can assist handling of the member 18 such as a heavy object by the user M. Thus, the work support device 10 according to the present embodiment can achieve reduction of the load of work by the user M in addition to the above-described effects. In addition, the time of work by the user M can be reduced. Moreover, the accuracy of work in the elevator shaft 2 by the user M can be improved.

The following describes an exemplary hardware configuration of the main control unit 30 in the work support device 10 according to the above-described embodiment.

Figure 14:
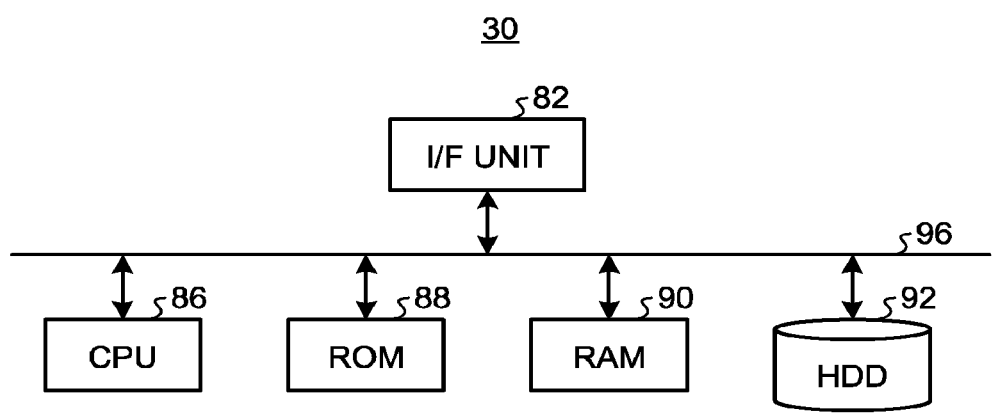
FIG. 14 is a hardware configuration diagram.

FIG. 14 is an exemplary hardware configuration diagram of the main control unit 30.

The main control unit 30 according to the above-described embodiment includes a control device such as a CPU 86, storage devices such as a read only memory (ROM) 88, a random access memory (RAM) 90, and a hard disk drive (HDD) 92, an I/F unit 82 as an interface to various instruments, and a bus 96 connecting these components, and has a hardware configuration of a normal computer.

In the main control unit 30 according to the above-described embodiment, each above-described component is achieved on a computer when the CPU 86 reads a computer program from the ROM 88 onto the RAM 90 and executes the computer program.

The HDD 92 may store a computer program for executing each above-described processing executed by the main control unit 30 according to the above-described embodiment. The computer program for executing each above-described processing executed by the main control unit 30 according to the above-described embodiment may be incorporated in the ROM 88 in advance and provided.

The computer program for executing the above-described processing executed by the main control unit 30 according to the above-described embodiment may be stored as a file of an installable or executable format in a computer-readable storage medium such as a CD-ROM, a CD-R, a memory card, a digital versatile disc (DVD), or a flexible disk (FD) and provided as a computer program product. The computer program for executing the above-described processing executed by the main control unit 30 according to the above-described embodiment may be stored on a computer connected with a network such as the Internet, and provided by downloading through the network. The computer program for executing the above-described processing executed by the main control unit 30 according to the above-described embodiment may be provided or distributed through a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A work support device, comprising:
  a sensor configured to measure a side portion of an in-passage structure of a passage; and
  control circuitry configured to
    control an irradiation source to emit light, indicative of a work region, to a corrected work position indicated by corrected work position information obtained by correcting, by using a result of measurement by the sensor, work position information set based on a predetermined designed in-passage structure indicative of an ideal structure in the passage, the designed in-passage structure being arranged at a position using, as a reference, a reference frame having a predetermined shape and including, as a side, a line connecting two reference lines adjacent to each other in the intersection direction,
    acquire observation information including observation points on an inside of the passage;
    acquire reference position information of a plurality of reference lines in the passage;
    calculate a position of the side portion of the in-passage structure based on the acquired observation information and the acquired reference position information; and
    correct the work position information to the corrected work position information based on the predetermined designed in-passage structure with reference to the reference position information and based on the calculated position of the side portion of the in-passage structure, wherein the control circuitry is further configured to acquire, as the reference position information, a position of each of the plurality of reference lines, which extend in the passage in an extension direction of the passage and arranged by being spaced in an intersection direction intersecting the extension direction, calculate the position of the side portion of the in-passage structure, which indicates a structure of the passage at a cross-section in the intersection direction based on the observation information and the reference position information, and correct the work position information to the corrected work position information such that a work position of the work position information, which is arranged on the designed in-passage structure, becomes a corresponding position on the in-passage structure.

2. The work support device according to claim 1, further comprising:

an arm configured to hold a member; and a drive unit configured to drive the arm to compensate for a weight of the held member.

3. The work support device according to claim 2, wherein the control circuitry is further configured to control the drive unit by switching drive information based on a direction or distance between the corrected work position of the corrected work position information and a holding unit of the member in the arm.

4. The work support device according to claim 2, wherein the control circuitry is further configured to control the drive unit such that driving of the arm is restricted in a region in a predetermined range from the corrected work position of the corrected work position information.

5. The work support device according to claim 2, wherein the control circuitry is further configured to output the corrected work position information and work state information updated based on a posture of the arm or a result of drive information.

6. The work support device according to claim 2, wherein the control circuitry is further configured to, for the corrected work position information, determine that the held member approaches based on a posture of the arm or a result of drive information and update work state information.

7. The work support device according to claim 1, wherein the irradiation source is installed on a moving member configured to move in the passage.

8. The work support device according to claim 1, wherein the passage is a hoistway of an elevator.

9. A work support method, comprising:

controlling an irradiation source to emit light, indicative of a work region, to a corrected work position indicated by corrected work position information obtained by correcting, by using a result of measurement by a sensor, work position information set based on a predetermined designed in-passage structure indicative of an ideal structure in a passage, the designed in-passage structure being arranged at a position using, as a reference, a reference frame having a predetermined shape and including, as a side, a line connecting two reference lines adjacent to each other in the intersection direction, acquiring observation information including observation points on an inside of the passage;

acquiring reference position information of a plurality of reference lines in the passage;

calculating a position of a side portion of an in-passage structure based on the acquired observation information and the acquired reference position information; and correcting the work position information to the corrected work position information based on the predetermined designed in-passage structure with reference to the reference position information and based on the calculated position of the side portion of the in-passage structure, wherein the method further comprises:

acquiring, as the reference position information, a position of each of the plurality of reference lines, which extend in the passage in an extension direction of the passage and arranged by being spaced in an intersection direction intersecting the extension direction, calculating the position of the side portion of the in-passage structure, which indicates a structure of the passage at a cross-section in the intersection direction based on the observation information and the reference position information, and correcting the work position information to the corrected work position information such that a work position of the work position information, which is arranged on the designed in-passage structure, becomes a corresponding position on the in-passage structure.

10. A non-transitory computer-readable medium storing instructions, which when executed by processing circuitry, cause the processing circuitry to perform a method, comprising:

controlling an irradiation source to emit light, indicative of a work region, to a corrected work position indicated by corrected work position information obtained by correcting, by using a result of measurement by a sensor, work position information set based on a predetermined designed in-passage structure indicative of an ideal structure in a passage, the designed in-passage structure being arranged at a position using, as a reference, a reference frame having a predetermined shape and including, as a side, a line connecting two reference lines adjacent to each other in the intersection direction, acquiring observation information including observation points on an inside of the passage;

acquiring reference position information of a plurality of reference lines in the passage;

calculating a position of a side portion of an in-passage structure based on the acquired observation information and the acquired reference position information; and correcting the work position information to the corrected work position information based on the predetermined designed in-passage structure with reference to the reference position information and based on the calculated position of the side portion of the in-passage structure, wherein the method further comprises:

acquiring, as the reference position information, a position of each of the plurality of reference lines, which extend in the passage in an extension direction of the passage and arranged by being spaced in an intersection direction intersecting the extension direction, calculating the position of the side portion of the in-passage structure, which indicates a structure of the passage at a cross-section in the intersection direction based on the observation information and the reference position information, and correcting the work position information to the corrected work position information such that a work position of the work position information, which is arranged on the designed in-passage structure, becomes a corresponding position on the in-passage structure.

11. The work support device of claim 1, wherein the work support device is configured to move upward and downward in the passage.

12. The work support device of claim 1, wherein the work support device is installed on a workbench configured to move upward and downward in the passage.

* * * * *